(12) United States Patent
Funato

(10) Patent No.: US 6,618,344 B1
(45) Date of Patent: Sep. 9, 2003

(54) OPTICAL PICKUP APPARATUS HAVING IMPROVED HOLOGRAPHIC OPTICAL ELEMENT AND PHOTODETECTOR

(75) Inventor: Hiroyoshi Funato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/494,549

(22) Filed: Jan. 31, 2000

Related U.S. Application Data

(62) Division of application No. 09/379,912, filed on Aug. 24, 1999, now Pat. No. 6,072,579.

(30) Foreign Application Priority Data

Aug. 27, 1998 (JP) .......................................... 10-242135
Sep. 9, 1998 (JP) .......................................... 10-255734

(51) Int. Cl.[7] .............................................. G11B 7/135
(52) U.S. Cl. .............................. 369/112.15; 369/112.12
(58) Field of Search ....................... 356/347; 369/44.23, 369/112.07, 112.1, 112.12, 112.15, 44.14; 359/15, 494

(56) References Cited

U.S. PATENT DOCUMENTS 5,612,820 A * 3/1997 Schrenk et al. ............. 156/229
5,739,952 A * 4/1998 Takeda et al. .............. 359/495
6,072,579 A * 6/2000 Funato ....................... 356/123

FOREIGN PATENT DOCUMENTS

JP 63-314502 12/1988
JP 7-3461 1/1995

* cited by examiner

Primary Examiner—W. R. Young
(74) Attorney, Agent, or Firm—Dickstein Shapiro Morin & Oshinsky LLP

(57) ABSTRACT

An optical pickup apparatus includes first and second light sources which selectively emit one of first and second light beams, the first and second light beams being different in wavelength, the wavelengths of the first and second light beams being appropriate for accessing first and second optical disks respectively. A coupling lens converts a corresponding one of the first and second light beams into a collimated beam. An objective lens forms a light spot on a corresponding one of the first and second optical disks by focusing the collimated beam. A holographic optical element receives a reflection beam of the light spot from one of the first and second optical disks and provides holographic effects on the reflection beam so as to diffract the reflection beam in predetermined diffracting directions depending on the wavelength of the reflection beam. A photodetector receives the reflection beam from the holographic optical element at light receiving areas and outputs signals indicative of respective intensities of the received reflection beam at the light receiving areas, so that a focusing error signal and a tracking error signal are generated based on the signals.

9 Claims, 14 Drawing Sheets

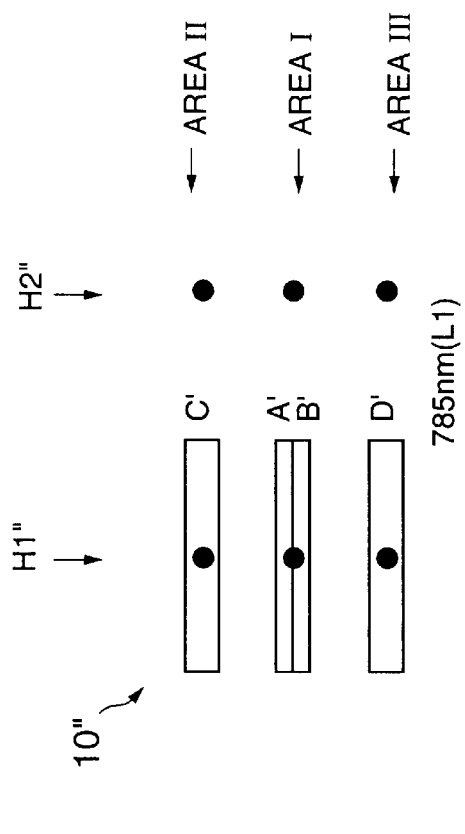
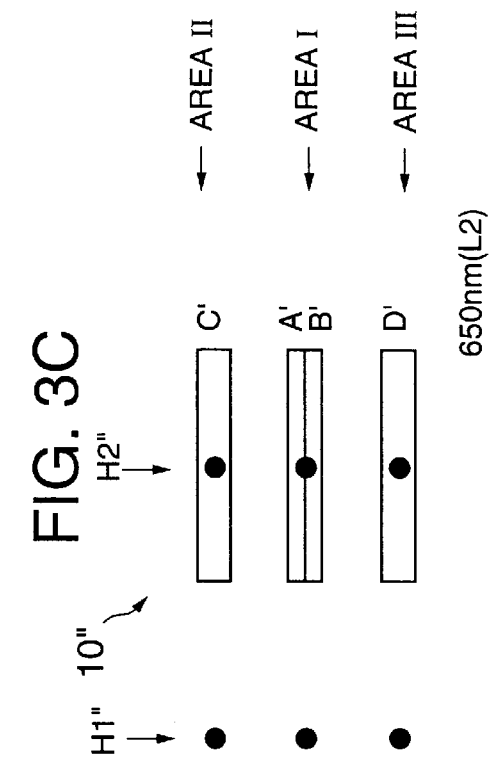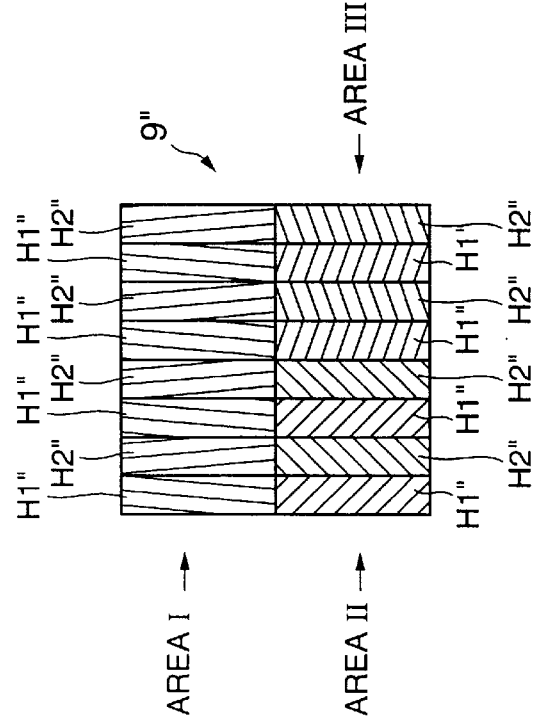

FIG. 17
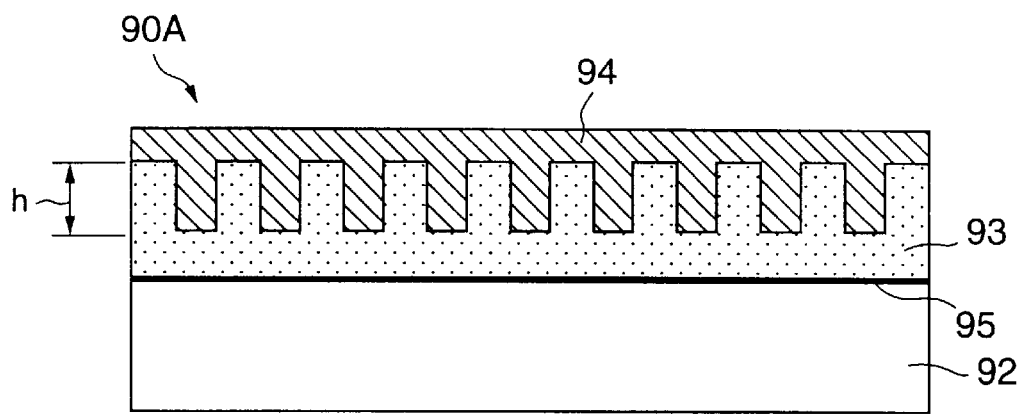
FIG. 18
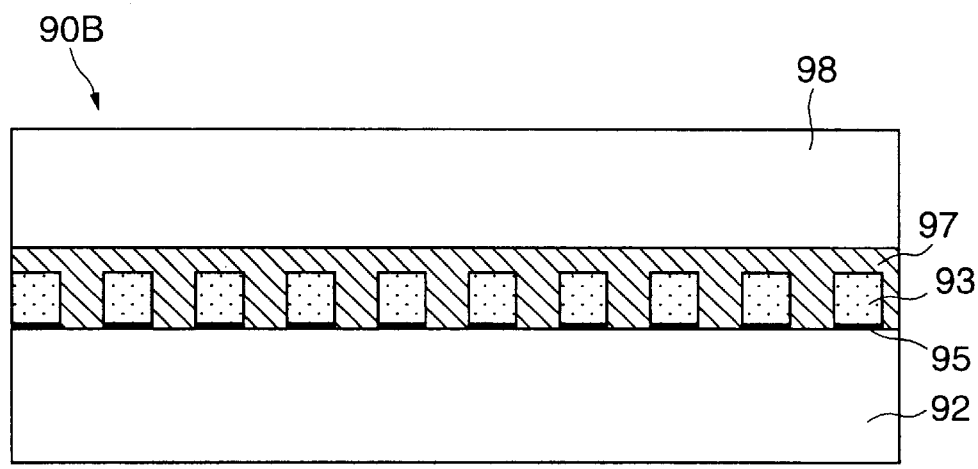
 ORGANIC POLYMER BIREFRINGENCE LAYER
 ISOTROPIC RESIN ADHESION LAYER

POLYAMIDE ACID LAYER
GLASS SUBSTRATE

POLYIMIDE FILM PRODUCED BY HEATING AND STRETCHING

DIRECTION OF STRETCHING

OPTICAL PICKUP APPARATUS HAVING IMPROVED HOLOGRAPHIC OPTICAL ELEMENT AND PHOTODETECTOR

This is a divisional of U.S. patent application Ser. No. 09/379,912, filed Aug. 24, 1999, now U.S. Pat. No. 6,072, 579 the entire disclosure of which is incorporated herein by reference.

BACKGROUND OF THE INVENTION (1) Field of the Invention

The present invention relates to an optical pickup apparatus which has a holographic optical element and a photodetector which are provided in common for light beams with different wavelengths used to access different types of optical storage media. (2) Description of the Related Art Currently, various types of rewritable optical disk drive are known, for example, a write-once optical disk drive which accesses a CD (compact disk recordable) and a rewritable optical disk drive which accesses a DVD (digital video disk). An optical pickup device of the write-once optical disk drive reads data from the CD, and can write data to the CD once only. An optical pickup device of the rewritable optical disk drive reads data from the DVD, and can write or erase data to the DVD many times.

Generally, a standard DVD has the recording surface under a transparent substrate which is about 0.6 mm thick, and a standard CD has the recording surface under a transparent substrate which is about 1.2 mm thick. In a DVD pickup device, a laser diode which emits a laser beam having a wavelength of 650 nm is used as the light source to access the DVD. In a CD pickup device, a laser diode which emits a laser beam having a wavelength of 785 nm is used as the light source to access the CD.

As disclosed in Japanese Utility Model Publication No.7-3461, an optical pickup apparatus for recording or reproducing of information of one of a first optical disk and a second optical disk in a shared manner is known. As described above, the first and second optical disks have the transparent substrates which are different in thickness.

In the optical pickup apparatus of the above publication, first and second laser sources selectively emit one of first and second laser beams, the first and second laser beams being different in wavelength, the wavelengths of the first and second laser beams being appropriate for accessing the first and second optical disks respectively. A reflection-beam separator which is configured with a prism of a certain type receives a reflection beam of a light spot from one of the first and second optical disks which is actually illuminated, and directs the reflection beam in one of predetermined directions depending on the wavelength of the reflection beam.

Further, in the optical pickup apparatus of the above publication, a first photodetector is provided to receive the reflection beam (having the wavelength of the first laser beam) from the reflection-beam separator, and to output a signal indicative of an intensity of the received reflection beam. A second photodetector which is provided separately from the first photodetector receives the reflection beam (having the wavelength of the second laser beam) from the reflection-beam separator, and outputs a signal indicative of an intensity of the received reflection beam.

In the optical pickup apparatus of the above publication, a focusing error signal and a tracking error signal can be generated based on the signal output by a corresponding one of the first and second photodetectors. Hence, the recording or reproducing of information of one of the first optical disk and the second optical disk can be achieved by the optical pickup apparatus of the above publication.

However, the optical pickup apparatus of the above publication must be configured with the first and second photodetectors which are provided independently of each other. The configuration of this apparatus is comparatively complicated, and it is necessary to provide a separate signal detection circuit for each of the first and second photodetectors. This makes the conventional optical pickup apparatus bulky and expensive, and it is difficult to achieve the manufacture of a small-size optical pickup apparatus with low cost.

SUMMARY OF THE INVENTION

An object of the present invention is to provide an improved optical pickup apparatus in which the above-described problems are eliminated.

Another object of the present invention is to provide an optical pickup apparatus which is configured in a simple structure including the reflection-beam separator and the photodetector, in order to enable the manufacture of an inexpensive, small-size optical pickup apparatus.

Still another object of the present invention is to provide an optical pickup apparatus which is configured with an inexpensive, thin-film reflection-beam separator to direct the reflection beam in one of predetermined directions depending on the wavelength of the reflection beam, in order to enable the manufacture of an inexpensive, small-size optical pickup apparatus.

The above-mentioned objects of the present invention are achieved by an optical pickup apparatus for recording or reproducing of information of one of a first optical disk and a second optical disk in a shared manner, the first and second optical disks having transparent substrates different in thickness, the optical pickup apparatus including: first and second light sources which selectively emit one of first and second light beams, the first and second light beams being different in wavelength, the wavelengths of the first and second light beams being appropriate for accessing the first and second optical disks respectively; a coupling lens which converts a corresponding one of the first and second light beams from the first and second light sources into a collimated beam; an objective lens forming a light spot on a corresponding one of the first and second optical disks by focusing the collimated beam; a holographic optical element which receives a reflection beam of the light spot from one of the first and second optical disks and provides holographic effects on the reflection beam so as to diffract the reflection beam in predetermined diffracting directions depending on the wavelength of the reflection beam; and a photodetector which receives the reflection beam from the holographic optical element at light receiving areas of the photodetector and outputs signals indicative of respective intensities of the received reflection beam at the light receiving areas, so that a focusing error signal and a tracking error signal are generated based on the signals output by the photodetector.

The above-mentioned objects of the present invention are achieved by an optical pickup apparatus for recording or reproducing of information of one of a first optical disk and a second optical disk in a shared manner, the first and second optical disks having transparent substrates different in thickness, the optical pickup apparatus including: first and second light sources which selectively emit one of first and second light beams, the first and second light beams being different in wavelength, the wavelengths of the first and second light beams being appropriate for accessing the first and second optical disks respectively; a coupling lens which converts a corresponding one of the first and second light beams from the first and second light sources into a collimated beam; an objective lens forming a light spot on a corresponding one of the first and second optical disks by focusing the collimated beam; a holographic optical element which receives a reflection beam of the light spot from one of the first and second optical disks and provides holographic effects on the reflection beam so as to diffract the reflection beam in predetermined diffracting directions depending on the wavelength of the reflection beam; and a photodetector which receives the reflection beam from the holographic optical element at light receiving areas of the photodetector and outputs signals indicative of respective intensities of the received reflection beam at the light receiving areas, so that a focusing error signal and a tracking error signal are generated based on the signals output by the photodetector, wherein the optical pickup apparatus has a common optical path for the first and second light beams, and the coupling lens and the objective lens are arranged such that both an optical axis of the coupling lens and an optical axis of the objective lens are on the common optical path, and wherein the holographic optical element is arranged on the common optical path and configured with a polarization hologram and a quarter-wave plate, the polarization hologram having diffracting effects depending on polarizing directions of the reflection beam, and the quarter-wave plate being arranged on the common optical path such that the quarter-wave plate is placed on an optical-disk side of the polarization hologram, and wherein the polarization hologram includes: a transparent substrate; a birefringence layer of a polymer material which is provided on the transparent substrate in a periodic grating pattern, the birefringence layer having different refractive indexes for two orthogonal polarizing directions of the reflection beam; and an isotropic overcoat layer which is provided to enclose the birefringence layer therein, the polarization hologram diffracting the reflection beam in the predetermined diffracting directions depending on the wavelength of the reflection beam.

A preferred embodiment of the optical pickup apparatus of the present invention is configured in a simple structure including the holographic optical element and the single-piece photodetector. The holographic optical element receives the reflection beam of the light spot from the corresponding one of the first and second optical disks and provides the holographic effects on the reflection beam so as to diffract the reflection beam in the predetermined diffracting directions depending on the wavelength of the reflection beam. The photodetector receives the reflection beam from the holographic optical element at light receiving areas of the photodetector and outputs signals indicative of respective intensities of the received reflection beam at the light receiving areas, so that a focusing error signal and a tracking error signal are generated based on the output signals of the photodetector. Therefore, the optical pickup apparatus of the present invention is effective in enabling the manufacture of an inexpensive, small-size optical pickup apparatus.

Another preferred embodiment of the optical pickup apparatus of the present invention is configured with an improved holographic optical element to direct the reflection beam in one of predetermined directions depending on the wavelength of the reflection beam. The improved holographic optical element is arranged on the common optical path and configured with the polarization hologram and the quarter-wave plate, and the polarization hologram includes the birefringence layer of the polymer material provided on the transparent substrate in the periodic grating pattern, the birefringence layer having different refractive indexes for the two orthogonal polarizing directions of the reflection beam. Hence, the improved holographic optical element is an inexpensive, small-size reflection-beam separator which diffracts the reflection beam in the predetermined diffracting directions depending on the wavelength of the reflection beam. Therefore, the optical pickup apparatus of the present invention is effective in enabling the manufacture of an inexpensive, small-size optical pickup apparatus.

BRIEF DESCRIPTION OF THE DRAWINGS

Other objects, features and advantages of the present invention will become more apparent from the following detailed description when read in conjunction with the accompanying drawings in which:

FIG. 3A, FIG. 3B and FIG. 3C are diagrams for explaining a holographic optical element and a photodetector in the optical pickup apparatus of the present invention;

FIG. 17 is a cross-sectional view of a further example of the polarization hologram in the optical pickup apparatus of the present invention;

FIG. 18 is a cross-sectional view of another example of the polarization hologram in the optical pickup apparatus of the present invention;

DETAILED DESCRIPTION OF THE PREFERRED EMBODIMENTS

A description will now be given of the preferred embodiments of the present invention with reference to the accompanying drawings.

Figure 1A:
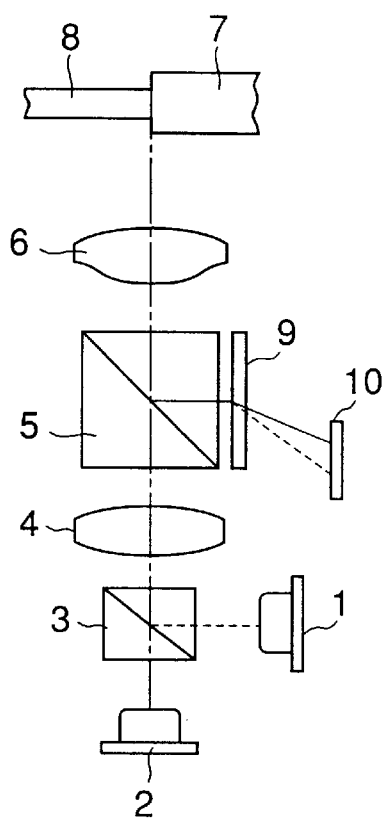
FIG. 1A, FIG. 1B and FIG. 1C are diagrams of one embodiment of an optical pickup apparatus of the present invention.
Figure 1B:
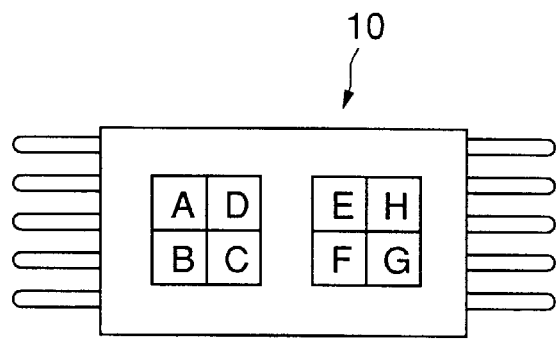
Figure 1C:
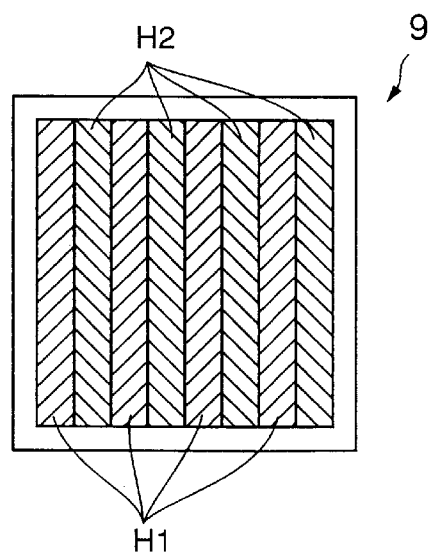

FIG. 1A, FIG. 1B and FIG. 1C show one embodiment of the optical pickup apparatus of the present invention.

In FIG. 1A, reference numeral 7 indicates a first optical disk (which is, for example, the CD), and reference numeral 8 indicates a second optical disk (which is, for example, the DVD). In the present embodiment, the first optical disk 7 is a CD (compact disk recordable) having a recording surface under a transparent substrate which is about 1.2 mm thick, while the second optical disk 8 is a DVD (digital video disk) having a recording surface under a transparent substrate which is about 0.6 mm thick.

In the optical pickup apparatus of FIG. 1A, a first light source 1 (for example, a laser diode) emits a first laser beam having a first wavelength L1 (=785 nm) which is appropriate for accessing the first optical disk (the CD) 7. A second light source 2 (for example, a laser diode) emits a second laser beam having a second wavelength L2 (=650 nm) which is appropriate for accessing the second optical disk (the DVD) 8. As shown in FIG. 1A, the optical pickup apparatus has a common optical path between the light sources 1 and 2 and the optical disks 7 and 8, and most elements of the optical pickup apparatus are arranged along the common optical path. The second light source 2 is arranged on the common optical path but the first light source 1 is arranged laterally from the common optical path.

When the CD 7 is accessed (the recording and reproducing of information) by the optical pickup apparatus of FIG. 1A, only the first light source 1 is turned ON to emit the first laser beam (L1) with the second light source 2 being turned OFF. A beam splitter 3 reflects the first laser beam (L1), emitted by the first light source 1, to the common optical path of the optical pickup apparatus. A dichroic mirror is provided in the beam splitter 3, and the dichroic mirror provides a reflection function for the first laser beam (L1) and a transmission function for the second laser beam (L2). In this case, the beam splitter 3 acts to reflect the first laser beam (L1) from the first light source 1 to a coupling lens 4. The coupling lens 4 converts the reflected first laser beam (L1) into a collimated beam passing through the coupling lens 4. In the present embodiment, the coupling lens 4 provides such a collimating effect on the incident laser beam. The coupling lens 4 may provide a profile correcting effect on the incident laser beam, in addition to the collimating effect.

The collimated beam (L1) from the coupling lens 4 enters a prism-type beam splitter 5, and the beam splitter 5 allows the collimated beam to pass through the beam splitter 5 to an objective lens 6. The objective lens 6 converts the collimated beam (L1) into a converging beam. The converging beam (L1) from the objective lens 6 passes through the transparent substrate of the first optical disk 7, and it forms a light spot on the recording surface of the first optical disk 7 by the focusing function of the objective lens 6. A reflection beam of the light spot from the first optical disk 7 passes through the objective lens 6, and the beam splitter 5 directs the reflection beam (L1) to a holographic optical element (HOE) 9 away from the common optical path. The HOE 9 provides an astigmatic effect and a diffracting effect on the lateral reflection beam (L1) from the beam splitter 5. These effects of the HOE 9 will be called the holographic effects. The reflection beam (L1) passing through the HOE 9 is diffracted and enters a photodetector 10. The photodetector 10 receives the reflection beam from the HOE 9 at light receiving areas of the photodetector 10, and outputs signals indicative of respective intensities of the received reflection beam at the light receiving areas, so that a focusing error signal and a tracking error signal are generated based on the signals output by the photodetector 10.

Further, when the DVD 8 is accessed (the recording or reproducing of information) by the optical pickup device of FIG. 1A, only the second light source 2 is turned ON to emit the second laser beam (L2) with the first light source 1 being turned OFF. The beam splitter 3 allows the second laser beam (L2) from the second light source 2 to pass through the beam splitter 3 along the common optical path. The second laser beam (L2) enters the coupling lens 4. The coupling lens 4 converts the second laser beam (L2) into a collimated beam. The collimated beam (L2) from the coupling lens 4 enters the beam splitter 5, and the beam splitter 5 allows the collimated beam to pass through the beam splitter 5 to the objective lens 6. The objective lens 6 converts the collimated beam (L2) into a converging beam. The converging beam (L2) from the objective lens 6 passes through the transparent substrate of the second optical disk 8, and it forms a light spot on the recording surface of the DVD 8 by the focusing function of the objective lens 6. A reflection beam of the light spot from the second optical disk 8 passes through the objective lens 6, and the beam splitter 5 directs the reflection beam (L2) to the holographic optical element (HOE) 9 away from the common optical path. The HOE 9 provides the holographic effects on the lateral reflection beam from the beam splitter 5 so as to diffract the reflection beam in diffracting directions depending on the wavelength (L2) of the received reflection beam. The reflection beam passing through the HOE 9 is diffracted and enters the photodetector 10. The photodetector 10 receives the reflection beam from the HOE 9 at separate light receiving areas of the photodetector 10, and outputs signals indicative of respective intensities of the received reflection beams at the light receiving areas, so that a focusing error signal and a tracking error signal are generated based on the signals output by the photodetector 10.

In the optical pickup apparatus of FIG. 1A, the coupling lens 4 and the objective lens 6 function as an optical focusing device for the first and second laser beams emitted by the first and second light sources 1 and 2. The coupling lens 4 and the objective lens 6 are configured by taking account of the difference between the laser beam wavelengths L1 and L2 as well as of the difference between the substrate thicknesses of the optical disks 7 and 8, such that an appropriate light spot is formed on each of the recording surfaces of the first and second optical disks 7 and 8 by the focusing effect of the coupling lens 4 and the objective lens 6. The objective lens 6 is a single element which is provided in common for the first and second laser beams (L1 and L2) emitted by the first and second light sources 1 and 2.

The beam splitter 3 functions as a beam collector for the first and second laser beams emitted by the first and second light sources 1 and 2. The beam splitter 3 is arranged on the common optical path so as to allow the first and second laser beams of the first and second light sources 1 and 2 to be collected to the coupling lens 4 along the common optical path.

In the optical pickup apparatus of FIG. 1A, the coupling lens 4 and the objective lens 6 are arranged on the common optical path such that both an optical axis of the coupling lens 4 and an optical axis of the objective lens 6 accord with the common optical path for the first and second laser beams.

FIG. 1B shows a configuration of the photodetector 10 in the optical pickup apparatus of FIG. 1A. As shown in FIG. 1B, the photodetector 10 includes a set of first light receiving areas (A, B, C, D) and a set of second light receiving areas (E, F, G, H) which are separately provided for the first and second laser beams having the different wavelengths L1 and L2. The photodetector 10 includes four first output pins connected to the first light receiving areas (A, B, C, D), four second output pins connected to the second light receiving areas (E, F, G, H), a grounding pin, and an extra output pin. The total number of the pins of the photodetector 10 in the present embodiment is 10.

The photodetector 10 receives the reflection beam (L1) from the HOE 9 at the first light receiving areas (A, B, C, D), and outputs signals (SA, SB, SC, SD), indicative of respective intensities of the received reflection beam at the light receiving areas (A, B, C, D), from the first output pins to a control unit (not shown) of the optical pickup apparatus. The photodetector 10 receives the reflection beam (L2) from the HOE 9 at the second light receiving areas (E, F, G, H), and outputs signals (SE, SF, SG, SH), indicative of respective intensities of the received reflection beam at the light receiving areas (E, F, G, H), from the second output pins to the control unit of the optical pickup apparatus.

FIG. 1C shows a configuration of the holographic optical element (HOE) 9 in the optical pickup apparatus of FIG. 1A. As shown in FIG. 1C, the HOE 9 is configured with a first hologram H1 and a second hologram H2 which are alternately arrayed in a parallel formation. The HOE 9 is configured such that the reflection beam is diffracted at the first hologram H1 to only the first light receiving areas (A, B, C, D) of the photodetector 10 when the reflection beam has the wavelength L1 of the first laser beam, and the reflection beam is diffracted at the second hologram H2 to only the second light receiving areas (E, F, G, H) of the photodetector 10 when the reflection beam has the wavelength L2 of the second laser beam.

As describe d above, when the reflection beam (L1) from the HOE 9 is received at the first light receiving areas (A, B, C, D), the photodetector 10 outputs the signals (SA, SB, SC, SD) from the first output pins thereof. In the control unit of the optical pickup apparatus, a focusing error signal (=(SA+SC)−(SB+SD)) is generated based on the output signals of the photodetector 10 in accordance with a known astigmatic method, and a tracking error signal (=(SA+SB)−(SC+SD)) is generated based on the output signals of the photodetector 10 in accordance with a known push-pull method. Also, in the control unit, an information signal (=SA+SB+SC+SD) is generated based on the output signals of the photodetector 10. Similarly, when the reflection beam (L2) from the HOE 9 is received at the second light receiving areas (E, F, G, H), the photodetector 10 outputs the signals (SE, SF, SG, SH) from the second output pins thereof. In the control unit of the optical pickup apparatus, a focusing error signal (=(SE+SG)−(SF+SH)) is generated based on the output signals of the photodetector 10 in accordance with the astigmatic method, and a tracking error signal (=(SE+SF)−(SG+SH)) is generated based on the output signals of the photodetector 10 in accordance with the push-pull method. Also, in the control unit, an information signal (=SE+SF+SG+SH) is generated based on the output signals of the photodetector 10.

In the above-described embodiment, the optical pickup apparatus is configured in a simple structure including the HOE 9 and the single-piece photodetector 10. The HOE 9 receives the reflection beam of the light spot from the corresponding one of the first and second optical disks 7 and 8 and provides the holographic effects on the reflection beam so as to diffract the reflection beam in the predetermined diffracting directions depending on the wavelength (L1/L2) of the reflection beam. The photodetector 10 receives the reflection beam from the HOE 9 at the light receiving areas of the photodetector 10 and outputs the signals indicative of respective intensities of the received reflection beam at the light receiving areas, so that a focusing error signal and a tracking error signal are generated based on the output signals of the photodetector 10. As the holographic optical element 9 and the single-piece photodetector 10 are inexpensive and have a small size, the optical pickup apparatus of the above-described embodiment is effective in enabling the manufacture of an inexpensive, small-size optical pickup apparatus.

Figure 2A:
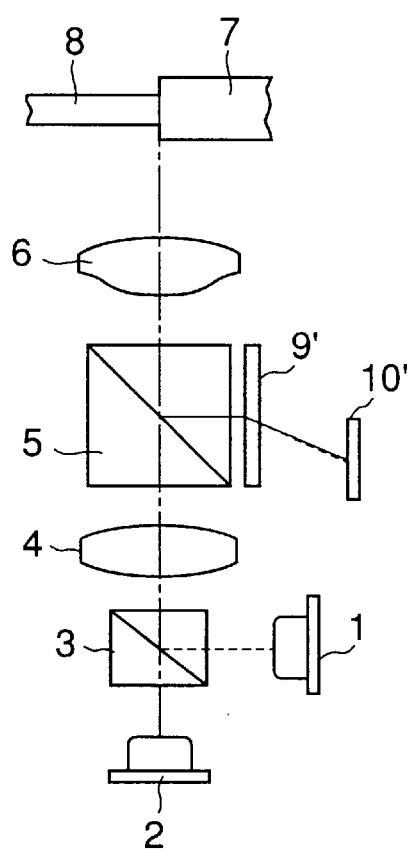
FIG. 2A, FIG. 2B and FIG. 2C are diagrams of another embodiment of the optical pickup apparatus of the present invention.
Figure 2B:
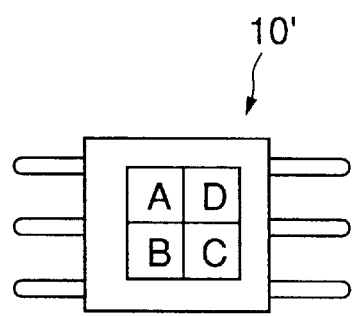
Figure 2C:
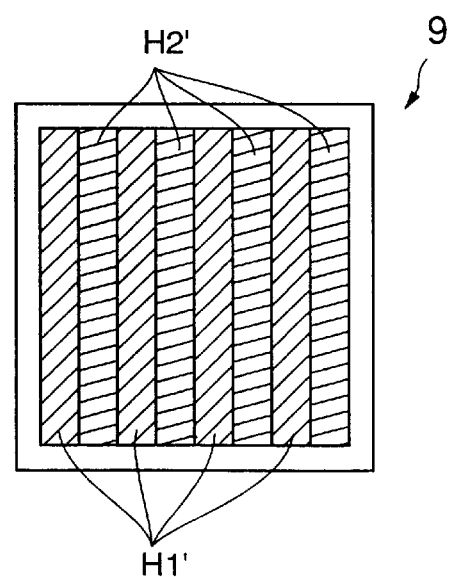

FIG. 2A, FIG. 2B and FIG. 2C show another embodiment of the optical pickup apparatus of the present invention.

In FIG. 2A, the elements which are essentially the same as corresponding elements in FIG. 1A are designated by the same reference numerals, and a description thereof will be omitted.

When the first optical disk (the CD) 7 is accessed by the optical pickup apparatus of FIG. 2A, a reflection beam of a light spot from the first optical disk 7 passes through the objective lens 6, and the beam splitter 5 directs the reflection beam (L1) to a holographic optical element (HOE) 9' away from the common optical path. The HOE 9' provides an astigmatic effect and a diffracting effect on the lateral reflection beam (L1) from the beam splitter 5. These effects of the HOE 9' is called the holographic effects. The reflection beam (L1) passing through the HOE 9' is diffracted and enters a photodetector 10'. The photodetector 10' receives the reflection beam from the HOE 9' at light receiving areas of the photodetector 10', and outputs signals indicative of respective intensities of the received reflection beam at the light receiving areas, so that a focusing error signal and a tracking error signal are generated based on the signals output by the photodetector 10'.

Similarly, when the second optical disk (the DVD) 8 is accessed by the optical pickup device of FIG. 2A, a reflection beam of a light spot from the second optical disk 8 passes through the objective lens 6, and the beam splitter 5 directs the reflection beam (L2) to the holographic optical element (HOE) 9' away from the common optical path. The HOE 9' provides the holographic effects on the lateral reflection beam from the beam splitter 5 so as to diffract the reflection beam in the diffracting directions depending on the wavelength (L2) of the received reflection beam. The reflection beam passing through the HOE 9' is diffracted and enters the photodetector 10'. The photodetector 10 receives the reflection beam from the HOE 9' at the light receiving areas of the photodetector 10', and outputs signals indicative of respective intensities of the received reflection beams at the light receiving areas, so that a focusing error signal and a tracking error signal are generated based on the signals output by the photodetector 10'.

Other features and advantages of the optical pickup apparatus of the present embodiment are essentially the same as those of the previous embodiment of FIG. 1A, and a duplicate description will be omitted.

FIG. 2B shows a configuration of the photodetector 10' in the optical pickup apparatus of FIG. 2A. As shown in FIG. 2B, the photodetector 10' includes a set of common light receiving areas (A, B, C, D) which is provided in common for the first and second light beams having the different wavelengths (L1 and L2). The photodetector 10' includes four output pins connected to the common light receiving areas (A, B, C, D), a grounding pin, and an extra output pin. The total number of the pins of the photodetector 10' in the present embodiment is 6. The photodetector 10' receives either the reflection beam (L1) or the reflection beam (L2) from the HOE 9' at the common light receiving areas (A, B, C, D). In either case, the photodetector 10' outputs signals (SA, SB, SC, SD), indicative of respective intensities of the received reflection beam at the common light receiving areas (A, B, C, D), from the output pins to a control unit (not shown) of the optical pickup apparatus.

FIG. 2C shows a configuration of the holographic optical element (HOE) 9' in the optical pickup apparatus of FIG. 2A. As shown in FIG. 2C, the HOE 9' is configured with a first hologram H1' and a second hologram H2' which are alternately arrayed in a parallel formation. The HOE 9' is configured such that the reflection beam is diffracted at the first hologram H1' to the common light receiving areas (A, B, C, D) of the photodetector 10' when the reflection beam has the wavelength L1 of the first laser beam, and the reflection beam is diffracted at the second hologram H2' to the common light receiving areas (A, B, C, D) of the photodetector 10' when the reflection beam has the wavelength L2 of the second laser beam.

When the reflection beam (L1) from the HOE 9' is received at the common light receiving areas (A, B, C, D), the photodetector 10' outputs the signals (SA, SB, SC, SD) from the output pins thereof to the control unit. In the control unit, a focusing error signal (=(SA+SC)–(SB+SD)) is generated based on the output signals of the photodetector 10' in accordance with the astigmatic method, and a tracking error signal (=(SA+SB)–(SC+SD)) is generated based on the output signals of the photodetector 10' in accordance with the push-pull method. Also, in the control unit, an information signal (=SA+SB+SC+SD) is generated based on the output signals of the photodetector 10'.

Similarly, when the reflection beam (L2) from the HOE 9' is received at the common light receiving areas (A, B, C, D), the photodetector 10' outputs the signals (SA, SB, SC, SD) from the output pins thereof to the control unit. In the control unit, a focusing error signal (=(SA+SC)–(SB+SD)) is generated based on the output signals of the photodetector 10' in accordance with the astigmatic method, and a tracking error signal (=(SA+SB)–(SC+SD)) is generated based on the output signals of the photodetector 10' in accordance with the push-pull method. Also, in the control unit, an information signal (=SA+SB+SC+SD) is generated based on the output signals of the photodetector 10'.

In the above-described embodiment, the optical pickup apparatus is configured in a simple structure including the HOE 9' and the single-piece photodetector 10'. The photodetector 10' includes only the light receiving areas (A, B, C, D), and it can be configured to have a size that is smaller than the size of the photodetector 10 of FIG. 1B. As the holographic optical element 9' and the single-piece photodetector 10' can be produced in a small size with low cost, the optical pickup apparatus of the above-described embodiment is effective in enabling the manufacture of an inexpensive, small-size optical pickup apparatus.

In the above embodiments of FIG. 1A and FIG. 2A, the focusing error signal is generated according to the astigmatic method, and the tracking error signal is generated according to the push-pull method. However, according to the present invention, a suitable combination of other known methods may be used instead to generate the focusing error signal and the tracking error signal. For example, in the following embodiment of FIG. 3A through FIG. 3C, the focusing error signal is generated according to a known knife-edge method, and the tracking error signal is generated according to the push-pull method. A description will now be given of such a variation.

FIG. 3A, FIG. 3B and FIG. 3C show a configuration of a holographic optical element (HOE) 9" and a photodetector 10" in the optical pickup apparatus of the present invention.

FIG. 3A shows a configuration of the HOE 9" which may be used instead of the HOE 9' in the optical pickup apparatus of FIG. 2A. As shown in FIG. 3A, the HOE 9" is configured with a first hologram H1" and a second hologram H2" which are alternately arrayed in a parallel formation. The HOE 9" is divided into three light receiving areas I, II and III, each of which include the first hologram H1" and the second hologram H2".

FIG. 3B and FIG. 3C show conditions of light spots on the photodetector 10" when the reflection beam (L1) or the reflection beam (L2) is received from the HOE 9". The photodetector 10" may be used instead of the photodetector 10' in the optical pickup apparatus of FIG. 2A. As shown in FIG. 3B and FIG. 3C, the photodetector 10" includes a set of light receiving areas (A', B', C', D') which is provided in common for the first and second laser beams having the first and second wavelengths L1 and L2. The photodetector 10" receives either the reflection beam (L1) or the reflection beam (L2) from the HOE 9" at the light receiving areas (A', B', C', D'). In either case, the photodetector 10" outputs signals (SA', SB', SC', SD'), indicative of respective intensities of the received reflection beam at the light receiving areas (A', B', C', D'), to the control unit (not shown) of the optical pickup apparatus.

Specifically, FIG. 3B shows a condition of the light spots on the photodetector 10" when the reflection beam (L1=785 nm) from the HOE 9" is received at the light receiving areas (A', B', C', D') of the photodetector 10". The reflection beam (L1) entering the area I of the HOE 9" is diffracted at the first hologram H1" to a midpoint of the light receiving areas A' and B' of the photodetector 10", and the light spot is formed there. The reflection beam (L1) entering the areas II and III of the HOE 9" is diffracted at the first hologram H1" to the light receiving areas C' and D' of the photodetector 10", and the two light spots are formed there. The reflection beam (L1) entering the HOE 9" is diffracted at the second hologram H2" to the right-side positions of the light receiving areas (A', B', C', D') of the photodetector 10". The three light spots with a slightly large size are formed there, and they do not enter the light receiving areas of the photodetector 10" as shown in FIG. 3B.

Similarly, FIG. 3C shows a condition of the light spots on the photodetector 10" when the reflection beam (L2=650 nm) from the HOE 9" is received at the light receiving areas (A', B', C', D') of the photodetector 10". The reflection beam (L2) entering the area I of the HOE 9" is diffracted at the second hologram H2" to the midpoint of the light receiving areas A' and B' of the photodetector 10", and the light spot is formed there. The reflection beam (L2) entering the areas II and III of the HOE 9" is diffracted at the second hologram H2" to the light receiving areas C' and D' of the photodetector 10", and the two light spots are formed there. The reflection beam (L2) entering the HOE 9" is diffracted at the first hologram H1" to the left-side positions of the light receiving areas (A', B', C', D') of the photodetector 10". The three light spots with a slightly large size are formed there, and they do not enter the light receiving areas of the photodetector 10" as shown in FIG. 3C.

The photodetector 10" outputs the signals (SA', SB', SC', SD') to the control unit. In the control unit, a focusing error signal (=(SA'−SB')) is generated based on the output signals of the photodetector 10" in accordance with the knife-edge method, and a tracking error signal (=(SC'−SD')) is generated based on the output signals of the photodetector 10" in accordance with the push-pull method. Also, in the control unit, an information signal (=(SA'+SB'+SC'+SD')) is generated based on the output signals of the photodetector 10".

Figure 4A:
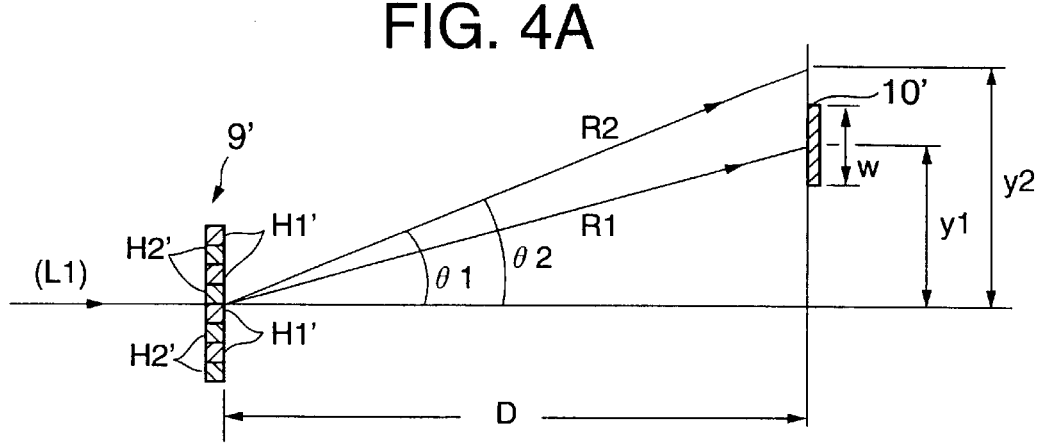
FIG. 4A and FIG. 4B are diagrams for explaining configuration requirements of the holographic optical element and the photodetector in the optical pickup apparatus of the present invention.
Figure 4B:
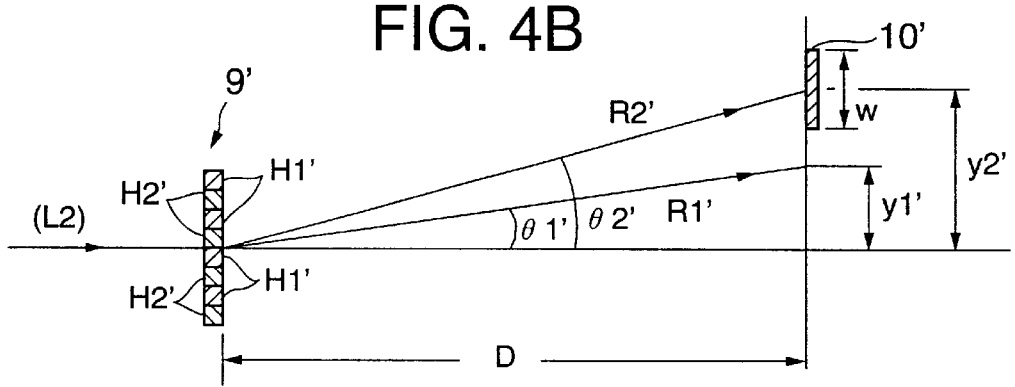

FIG. 4A and FIG. 4B show configuration requirements of the holographic optical element and the photodetector in the optical pickup apparatus of the present invention.

In the case of the optical pickup apparatus of FIG. 2A, when the reflection beam (L1) from the HOE 9' is received at the photodetector 10', the light spots are formed on the common light receiving areas (A, B, C, D) of the photodetector 10' by the diffraction of the reflection beam by the first hologram H1', and it is necessary that the diffracted rays produced by the second hologram H2' from the reflection beam (L1) do not enter the light receiving areas (A, B, C, D) of the photodetector 10' and do not interfere with the light spots on the light receiving areas (A, B, C, D). In FIG. 4A and FIG. 4B, the configuration requirements of the holographic optical element (HOE) 9' and the photodetector 10' for suitably forming the light spots with the diffracted rays by the first hologram H1' and avoiding the interference of the diffracted rays by the second hologram H2' with the light spots will be explained.

As shown in FIG. 4A, when the reflection beam (L1) enters the HOE 9', a principal diffracted ray R1 is produced by the first hologram H1' from the reflection beam (L1) and a principal diffracted ray R2 is produced by the second hologram H2' from the reflection beam (L1). The diffracted ray R1 is at an angle $\theta 1$ to the optical axis of the HOE 9', and the diffracted ray R2 is at an angle $\theta 2$ to the optical axis of the HOE 9'. Suppose that a grating pitch of the first hologram H1' of the HOE 9' is indicated by d1, a grating pitch of the second hologram H2' of the HOE 9' is indicated by d2, a width of the light receiving areas of the photodetector 10' is indicated by W, and a distance between the HOE 9' and the photodetector 10' is indicated by D.

In FIG. 4A, supposing that the point where the diffracted ray R1 hits the surface of the photodetector 10' lies at a distance "y1" in a direction perpendicular to the optical axis of the HOE 9', the positional relationship: y1=D*tan $\theta 1$ is met. With respect to the diffraction by the first hologram H1', the equation: sin $\theta 1$=L1/d1 is satisfied where L1 is the wavelength of the first laser beam and d1 is the grating pitch of the first hologram H1'. Therefore, $\theta 1 = \sin^{-1}(L1/d1)$. Also, supposing that the point where the diffracted ray R2 hits the surface of the photodetector 10' lies at a distance "y2" in a direction perpendicular to the optical axis of the HOE 9', the positional relationship: y2=D*tan $\theta 2$ is met. With respect to the diffraction by the second hologram H2', the equation: sin $\theta 2$=L1/d2 is satisfied where L1 is the wavelength of the first laser beam and d2 is the grating pitch of the second hologram H2'. Therefore, $\theta 2 = \sin^{-1}(L1/d2)$.

The positional relationships for the diffracted ray R1 and for the diffracted ray R2 are $$y1 = D^*\tan \theta 1 = D^*\tan\{\sin^{-1}(L1/d1)\}$$

$$y2 = D^*\tan \theta 2 = D^*\tan\{\sin^{-1}(L1/d2)\}.$$

In this case, as shown in FIG. 4A, the hit point of the diffracted ray R1 lies substantially at the midpoint of the light receiving areas of the photodetector 10', and it is necessary that the hit point of the diffracted ray R2 deviates from the edge of the light receiving areas of the photodetector 10'. In other words, if the difference between the distance y1 (the hit point of the diffracted ray R1) and the distance y2 (the hit point of the diffracted ray R2) is larger than or equal to half the width W of the light receiving areas of the photodetector 10', the light spots can be suitably formed at the light receiving areas of the photodetector 10' by the diffracted ray R1 of the first hologram H1', and the interference of the diffracted ray R2 of the second hologram H2' with the light spots can be avoided. By this assumption, the configuration requirement of the HOE 9' and the photodetector 10' is represented by $$W \leq 2D[\tan\{\sin^{-1}(L1/d2)\} - \tan\{\sin^{-1}(L1/d1)\}] \tag{1}$$

As shown in FIG. 4B, when the reflection beam (L2) enters the HOE 9', a principal diffracted ray R1' is produced by the first hologram H1' from the reflection beam (L2) and a principal diffracted ray R2' is produced by the second hologram H2' from the reflection beam (L2). The diffracted ray R1' is at an angle $\theta'$ to the optical axis of the HOE 9', and the diffracted ray R2' is at an angle $\theta 2'$ to the optical axis of the HOE 9'. Suppose that the grating pitch of the first hologram H1' of the HOE 9' is indicated by d1, the grating pitch of the second hologram H2' of the HOE 9' is indicated by d2, the width of the light receiving areas of the photodetector 10' is indicated by W, and the distance between the HOE 9' and the photodetector 10' is indicated by D.

In FIG. 4B, supposing that the point where the diffracted ray R1' hits the surface of the photodetector 10' lies at a distance "y1'" in the direction perpendicular to the optical axis of the HOE 9', the positional relationship: y1'=D-tan $\theta'$ is met. With respect to the diffraction by the first hologram H1', the equation: sin $\theta'$=L2/d1 is satisfied where L2 is the wavelength of the second laser beam and d1 is the grating pitch of the first hologram H1'. Therefore, $\theta 1' = \sin^{-1}(L2/d1)$. Also, supposing that the point where the diffracted ray R2' hits the surface of the photodetector 10' lies at a distance "y2'" in the direction perpendicular to the optical axis of the HOE 9', the positional relationship: y2'=D*tan $\theta 2'$ is met. With respect to the diffraction by the second hologram H2', the equation: sin $\theta 2'$=L2/d2 is satisfied where L2 is the wavelength of the second laser beam and d2 is the grating pitch of the second hologram H2'. Therefore, $\theta 2' = \sin^{-1}(L2/d2)$.

The positional relationships for the diffracted ray R1' and for the diffracted ray R2' are $$y1' = D^*\tan \theta 1' = D^*\tan\{\sin^{-1}(L2/d1)\}$$

$$y2' = D^*\tan \theta 2' = D^*\tan\{\sin^{-1}(L2/d2)\}.$$

In this case, as shown in FIG. 4B, the hit point of the diffracted ray R2' lies substantially at the midpoint of the light receiving areas of the photodetector 10', and it is necessary that the hit point of the diffracted ray R1' deviates from the edge of the light receiving areas of the photodetector 10'. In other words, if the difference between the distance y1' (the hit point of the diffracted ray R1') and the distance y2' (the hit point of the diffracted ray R2') is larger than or equal to half the width W of the light receiving areas of the photodetector 10', the light spots can be suitably formed at the light receiving areas of the photodetector 10' by the diffracted ray R2' of the second hologram H2', and the interference of the diffracted ray R1' of the first hologram H1' with the light spots can be avoided. By this assumption, the configuration requirement of the HOE 9' and the photodetector 10' is represented by $$W \leq 2D[\tan\{\sin^{-1}(L2/d2)\} - \tan(\sin^{-1}\{L2/d1)\}] \quad (2)$$

In the optical pickup apparatus of FIG. 2A, the holographic optical element (HOE) 9' and the photodetector 10' are configured so as to satisfy the above configuration requirements (1) and (2), and this makes it possible to ensure that the light spots are suitably formed by the diffracted rays by one of the first hologram H1' and the second hologram H2' and the interference of the diffracted rays by the other hologram (the second hologram H2' or the first hologram H1') with the light spots is avoided.

Figure 5A:
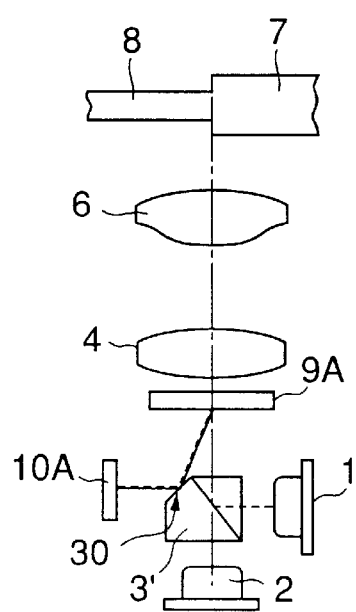
FIG. 5A and FIG. 5B are diagrams of still another embodiment of the optical pickup apparatus of the present invention.
Figure 5B:
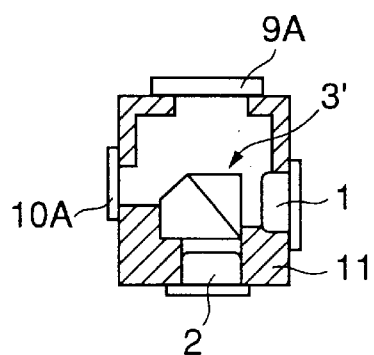

Next, FIG. 5A and FIG. 5B show still another embodiment of the optical pickup apparatus of the present invention. In FIG. 5A and FIG. 5B, the elements which are essentially the same as corresponding elements in FIG. 1A or FIG. 2A are designated by the same reference numerals, and a description thereof will be omitted.

In the optical pickup apparatus of FIG. 5A, the beam splitter 5 as in the previous embodiments of FIG. 1A and FIG. 2A is eliminated. The optical pickup apparatus of FIG. 5A has a common optical path for the first and second laser beams (L1 and L2), and the coupling lens 4 and the objective lens 6 are arranged such that both an optical axis of the coupling lens 4 and an optical axis of the objective lens 6 accord with the common optical path. The objective lens 6 is a single element which is provided in common for the first and second laser beams (L1 and L2) emitted by the first and second laser sources 1 and 2. A holographic optical element (HOE) 9A is arranged on the common optical path. A beam splitter 3', which is provided instead of the beam splitter 3 as in the embodiments of FIG. 1A and FIG. 2A, reflects the first laser beam (L1), emitted by the first laser source 1, to the common optical path. The beam splitter 3' reflects the first laser beam (L1) to the coupling lens 4, and allows the second laser beam (L2), emitted by the second laser source 2, to pass through the beam splitter 3'. The beam splitter 3' acts as the beam collector that is arranged on the common optical path adjacent to the first and second light sources 1 and 2 and allows the first and second light beams (L1 and L2) from the first and second light sources 1 and 2 to be collected to the coupling lens 4 along the common optical path.

The holographic optical element (HOE) 9A allows both the first and second laser beams (L1 and L2) to pass through the HOE 9A, which can be considered the 0-order diffracted rays derived from the emission beams at the HOE 9A. The coupling lens 4 converts the reflected laser beam (L1/L2) into the collimated beam passing through the coupling lens 4. The collimated beam (L1/L2) from the coupling lens 4 enters the objective lens 6. The objective lens 6 converts the collimated beam into a converging beam. The converging beam (L1/L2) from the objective lens 6 passes through the transparent substrate of the optical disk 7 or 8, and it forms a light spot on the recording surface of the optical disk 7 or 8 by the focusing function of the objective lens 6.

A reflection beam (L1/L2) of the light spot from one of the first and second optical disks 7 and 8 passes through the objective lens 6 and the coupling lens 4, and enters the HOE 9A along the common optical path. The HOE 9A provides the holographic effects on the reflection beam (L1/L2) from the coupling lens 4. The reflection beam (L1/L2) passing through the HOE 9A is diffracted. In the beam splitter 3', a slanted reflection surface 30 is formed at an appropriate position of the beam splitter 3'. The reflection beam from the HOE 9A is reflected on the reflection surface 30 of the beam splitter 31 and enters the photodetector 10A. The photodetector 10A receives the reflection beam from the HOE 9A at the light receiving areas of the photodetector 10, and outputs signals indicative of respective intensities of the received reflection beam at the light receiving areas, so that a focusing error signal and a tracking error signal are generated based on the signals output by the photodetector 10A.

In the optical pickup apparatus of FIG. 5A, the HOE 9 of FIG. 1C and the photodetector 10 of FIG. 1B may be used as the HOE 9A and the photodetector 10A. Alternatively, the HOE 9' of FIG. 2C and the photodetector 10' of FIG. 2B may be used as the HOE 9A and the photodetector 10A in the embodiment of FIG. 5A. Further, the HOE 9" of FIG. 3A and the photodetector 10" of FIG. 3B and FIG. 3C may be used as the HOE 9A and the photodetector 10A in the embodiment of FIG. 5A.

In the optical pickup apparatus of FIG. 5A, the holographic optical element (HOE) 9A is arranged on the common optical path, and the beam splitter 3', the first and second light sources 1 and 2, the HOE 9A and the photodetector 10A are accommodated in a common module 11 as shown in FIG. 5B.

Figure 6:
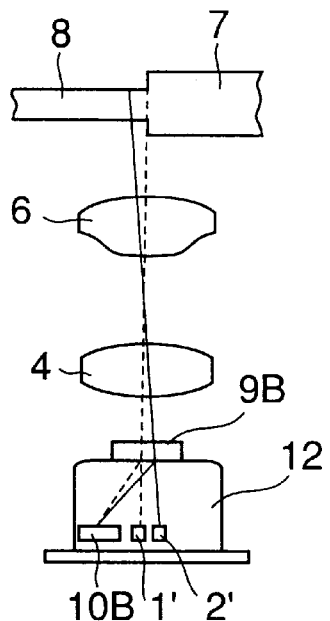
FIG. 6 is a diagram of a further embodiment of the optical pickup apparatus of the present invention.

FIG. 6 shows a further embodiment of the optical pickup apparatus of the present invention. In FIG. 6, the elements which are essentially the same as corresponding elements in FIG. 5A are designated by the same reference numerals, and a description thereof will be omitted.

In the optical pickup apparatus of FIG. 6, the beam splitter 3 and the beam splitter 5 as in the previous embodiments of FIG. 1A and FIG. 2A are eliminated. A first laser diode 1' which emits the first laser beam with the wavelength L1 (=785 nm) and a second laser diode 2' which emits the second laser beam with the wavelength L2 (=650 nm) are arranged in a vicinity of the common optical path of the optical pickup apparatus, and the first and second laser diodes 1' and 2', a photodetector 10B and a holographic optical element (HOE) 9B are accommodated in a common package 12.

Similar to the embodiment of FIG. 5A, the HOE 9B in the optical pickup apparatus of FIG. 6 is arranged on the common optical path. As shown in FIG. 6, the first and second laser diodes 1' and 2', the HOE 9B and the photodetector 10B are integrated into the common package 12. This configuration is effective in making the optical pickup apparatus of the present embodiment compact. In the optical pickup apparatus of FIG. 6, the photodetector 10' of FIG. 2B may be used as the photodetector 10B. Alternatively, the photodetector 10 of FIG. 1B may be used as the photodetector 10B in the optical pickup apparatus of FIG. 6.

Figure 7A:
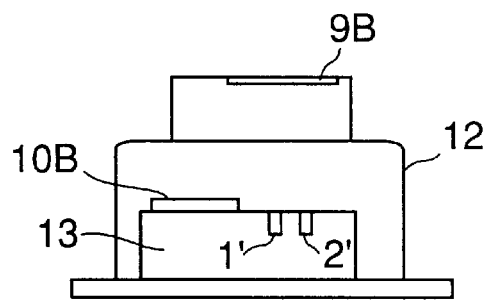
FIG. 7A and FIG. 7B are diagrams showing examples of a common package in the optical pickup apparatus of the present invention.
Figure 7B:
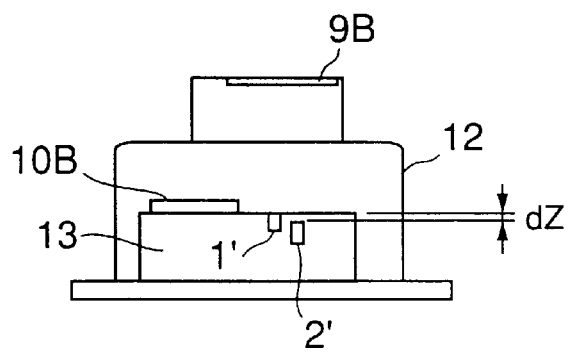

FIG. 7A and FIG. 7B show examples of the common package 12 in the optical pickup apparatus of the present invention. In FIG. 7A and FIG. 7B, the elements which are essentially the same as corresponding elements in FIG. 6 are designated by the same reference numerals, and a description thereof will be omitted.

In the common package 12 of FIG. 7A, the first and second laser diodes 1' and 2' are bonded to a heat sink 13 and the photodetector 10B is mounted on the heat sink 13. Further, the HOE 9B is attached to the top surface of the common package 12 by using an adhesive agent. In this manner, the first and second laser diodes 1' and 2', the HOE 9B and the photodetector 10B are integrated into the common package 12.

In the common package 12 of FIG. 7B, the first and second laser diodes 1' and 2' are bonded to the heat sink 13 such that a height of the first laser diode 1' on the bottom of the common package 12 is different from a height of the second laser diode 2' on the bottom of the common package 12 by a distance "dZ" along the common optical path of the optical pickup apparatus. Other features and advantages of this embodiment are the same as those of the common package 12 of FIG. 7A.

As in the optical pickup apparatus of FIG. 6, the first and second optical disks 7 and 8 have the transparent substrates which are different in thickness. In order to allow the focusing effect of the coupling lens 4 and the objective lens 6 that forms an appropriate light spot on each of the recording surfaces of the first and second optical disks 7 and 8, the coupling lens 4 and the objective lens 6 are configured by taking account of the difference between the laser beam wavelengths L1 and L2 as well as of the difference between the substrate thicknesses of the optical disks 7 and 8. The height-difference configuration of the laser diodes 1' and 2' in the common package 12 of FIG. 7B is effective in designing the coupling lens 4 and the objective lens 6 into a suitable configuration.

Figure 8:
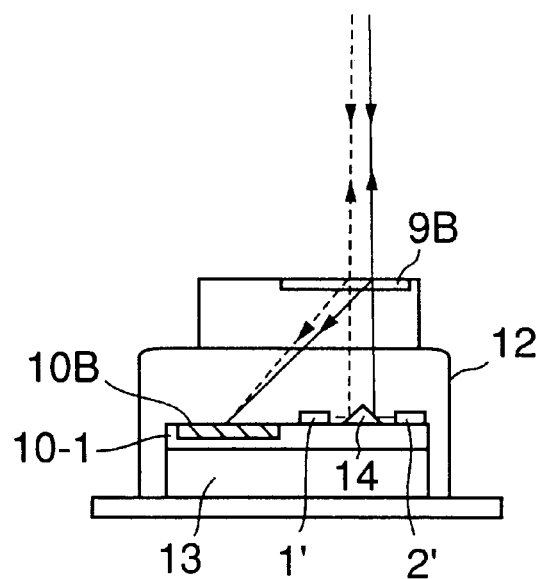
FIG. 8 is a diagram showing another example of the common package in the optical pickup apparatus of the present invention.

FIG. 8 shows another example of the common package 12 in the optical pickup apparatus of the present invention. In FIG. 8, the elements which are essentially the same as corresponding elements in FIG. 7A are designated by the same reference numerals, and a description thereof will be omitted.

In the common package 12 of FIG. 8, a silicon substrate 10-1 is bonded to the top of the heat sink 13, and the first and second laser diodes 1' and 2' are horizontally mounted on the silicon substrate 10-1. A reflection mirror 14 which is provided in a triangular cross section is mounted on the silicon substrate 10-1 such that the laser diodes 1' and 2' confront the reflection mirror 14 from the opposite sides of the reflection mirror 14. The first laser beam (L1) emitted by the first laser diode 1' is reflected at one side of the reflection mirror 14 toward the first optical disk 7, and the second laser beam (L2) emitted by the second laser diode 2' is reflected at the other side of the reflection mirror 12 toward the second optical disk 8. Further, the photodetector 10B is formed on the silicon substrate 10-1, and the HOE 9B is attached to the top surface of the common package 12 by using an adhesive agent. In this manner, the first and second laser diodes 1' and 2', the HOE 9B and the photodetector 10B are integrated into the common package 12.

In the common package 12 of FIG. 8, the first and second laser diodes 1' and 2' are arranged in a vicinity of the common optical path of the optical pickup apparatus, and they are horizontally mounted on the silicon substrate 10-1. This configuration is effective in achieving a good positional accuracy of the elements of the optical pickup apparatus when manufactured. The silicon substrate 10-1 provides good heat dissipation and functions as a heat sink for the laser diodes 1' and 2'. Further, the common package 12 of FIG. 8 may be modified such that reflection surfaces are formed at a portion of the silicon substrate 10-1 by using anisotropic etching in order to substitute for the reflection mirror 14.

Figure 9:
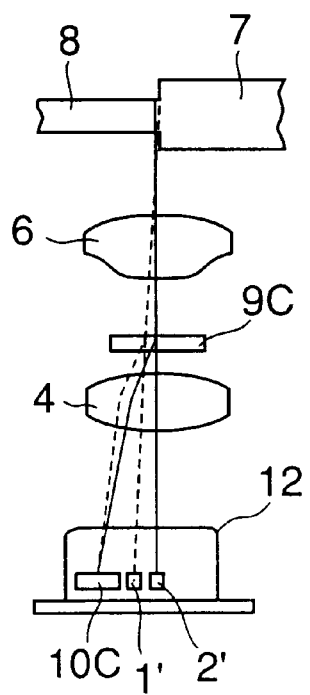
FIG. 9 is a diagram of another embodiment of the optical pickup apparatus of the present invention.

FIG. 9 shows another embodiment of the optical pickup apparatus of the present invention. In FIG. 9, the elements which are essentially the same as corresponding elements in FIG. 6 are designated by the same reference numerals, and a description thereof will be omitted.

In the optical pickup apparatus of FIG. 9, a holographic optical element (HOE) 9C is arranged on the common optical path between the coupling lens 4 and the objective lens 6. Similar to the previous embodiment of FIG. 6, a photodetector 10C in the optical pickup apparatus of FIG. 9 is accommodated in the common package 12 together with the first and second laser diodes 1' and 2'. In the case of the common package 12 of FIG. 8, the HOE 9B and the photodetector 10B are arranged at positions within the common package 12 that are adjacent to each other. It is necessary that the reflection beam passing through the HOE 9B is sharply diffracted to the photodetector 10B. However, in the configuration of FIG. 9, the HOE 9C and the photodetector 10C can be arranged at a relatively large distance along the optical axis, and it is possible that the reflection beam passing through the HOE 9C be moderately diffracted to the photodetector 10C.

In the case of the optical pickup apparatus of FIG. 9, the photodetector 10C may be the same as the photodetector 10' of FIG. 2B. That is, the photodetector 10C includes the common light receiving areas (A, B, C, D) as shown in FIG. 2B. Suppose that the HOE 9C is configured with a first hologram H1 and a second hologram H2. In the following, the configuration requirement of the HOE 9C appropriate for the optical pickup apparatus of FIG. 9 will be explained.

When the reflection beam (L1/L2) enters the HOE 9C, a principal diffracted ray is produced by the first hologram H1 from the reflection beam (L1) and a principal diffracted ray is produced by the second hologram H2 from the reflection beam (L2). The first diffracted ray is at an angle θ1 to the optical axis of the HOE 9C, and the second diffracted ray is at an angle θ2 to the optical axis of the HOE 9C. Suppose that a grating pitch of the first hologram H1 of the HOE 9C is indicated by d1, and a grating pitch of the second hologram H2 of the HOE 9C is indicated by d2. With respect to the diffraction by the first hologram H1, the equation: sin θ1=L1/d1 is satisfied where L1 is the wavelength of the first laser beam and d1 is the grating pitch of the first hologram H1. With respect to the diffraction by the second hologram H2, the equation: sin θ2=L2/d2 is satisfied where L2 is the wavelength of the second laser beam and d2 is the grating pitch of the second hologram H2.

In this case, the configuration requirement of the HOE 9C means that the hit point of the first diffracted ray and the hit point of the second diffracted ray are substantially at the same position in the light receiving areas of the photodetector 10C. That is, if the diffraction angle θ1 is equal to the diffraction angle θ2, the reflection beam passing through the HOE 9C can be appropriately diffracted to the photodetector 10C. By this assumption (θ1=θ2), the configuration requirement of the HOE 9C is represented by the formula L1/d1=L2/d2. Hence, it is readily understood that the HOE 9C can be configured with the first hologram H1 and the second hologram H2 so as to satisfy the configuration requirement L1/d1=L2/d2.

Figure 10:
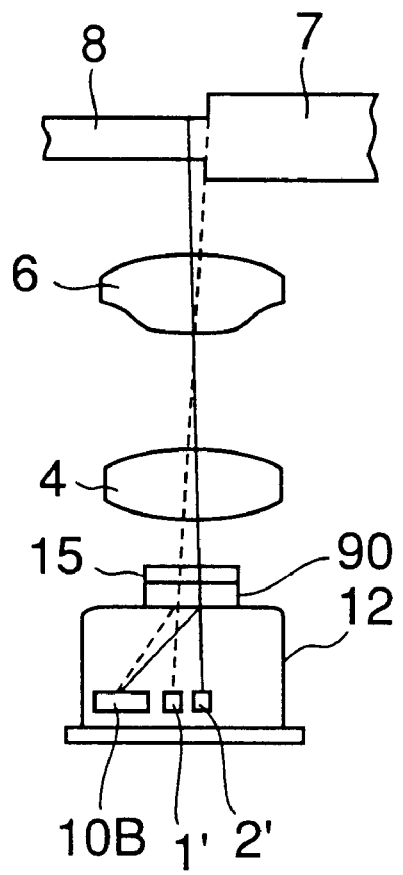
FIG. 10 is a diagram of a further embodiment of the optical pickup apparatus of the present invention.

FIG. 10 shows a further embodiment of the optical pickup apparatus of the present invention. In FIG. 10, the elements which are essentially the same as corresponding elements in FIG. 6 are designated by the same reference numerals, and a description thereof will be omitted.

The optical pickup apparatus of FIG. 10 has a common optical path for the first and second laser beams (L1 and L2), and the coupling lens 4 and the objective lens 6 are arranged such that both an optical axis of the coupling lens 4 and an optical axis of the objective lens 6 accord with the common optical path. The objective lens 6 is a single element which is provided in common for the first and second laser beams emitted by the first and second laser diodes 1' and 2'.

In the optical pickup apparatus of FIG. 10, the holographic optical element (HOE), such as the element 9B in the previous embodiment of FIG. 6, is configured with a polarization hologram 90 and a quarter-wave plate 15. The polarization hologram 90 has diffracting effects depending on polarizing directions of the incident beam. The quarter-wave plate 15 is arranged on the common optical path such that the quarter-wave plate 15 is placed on an optical-disk side of the polarization hologram 90.

Further, in the optical pickup apparatus of FIG. 10, the first and second laser diodes 1' and 2' are arranged in a vicinity of the common optical path, and the first and second laser diodes 1' and 2', the photodetector 10B and the holographic optical element (90, 15) are accommodated in the common package 12. The holographic optical element (90, 15) is arranged on the common optical path, and the first and second laser diodes 1' and 2', the photodetector 10B and the holographic optical element (90, 15) are integrated into the common package 12.

In the case of the optical pickup apparatus of FIG. 6, the emission beam from one of the laser light sources 1' and 2' is allowed to pass through the holographic optical element (HOE) 9B toward the optical disk 7 or 8 as the 0-order diffracted ray with the other diffracted components being made ineffective. The energy of the emission beam from the light source will be partially lost when transmitted through the HOE 9B.

In the optical pickup apparatus of FIG. 10, the holographic optical element (HOE) is configured with the polarization hologram 90 and the quarter-wave plate 15. The polarization hologram 90 in the present embodiment has diffracting effects depending on the polarizing directions of the incident beam. Specifically, the polarization hologram 90 allows the p-polarized light of the incident beam to pass through the polarization hologram 90 without diffraction, and diffracts 80% or more of the s-polarized light of the incident beam.

In the optical pickup apparatus of FIG. 10, the direction of the emission beam from the laser diodes 1' and 2' to enter the polarization hologram 90 is adjusted such that the p-polarized light of the emission beam from the laser light source suitably enters the polarization beam 90. In the present embodiment, the emission beam from the laser light source efficiently passes through the polarization hologram 90 toward the optical disk 7 or 8. The emission beam passing through the polarization hologram 90 is converted into a circularly polarized beam at the quarter-wave plate 15. The reflection beam from the optical disk 7 or 8 is converted into a linearly polarized beam by the quarter-wave plate 15, and the polarizing directions of the reflection beam are rotated 90° from the original polarizing directions. The s-polarized light of the reflection beam from the quarter-wave plate 15 enters the polarization hologram 90. The polarization hologram 90 diffracts 80% or more of the s-polarized light of the reflection beam to the photodetector 10B as the +1-order diffracted ray and the −1-order diffracted ray. Therefore, 40% or more of the s-polarized light of the reflection beam can be collected to the photodetector 10B as the light spot thereon. The optical pickup apparatus of the present embodiment is effective in increasing the efficiency of light transmission from the laser diodes 1' and 2' to the photodetector 10B over the efficiency of the previous embodiment of FIG. 6.

Concerning the polarization hologram, such as the element 90 in the embodiment of FIG. 10, a thin-film polarization hologram having a birefringence layer of an inorganic crystal material, such as $LiNbO_3$, is known. For example, see Japanese Laid-Open Patent Application No.63-314502. However, the manufacture of such a polarization hologram requires a time-consuming ion exchange process, and it has been expensive. This makes the optical pickup apparatus incorporating such a polarization hologram expensive, and it is difficult to achieve the manufacture of a small-size optical pickup apparatus with low cost.

Next, a description will be given of features and advantages of the polarization hologram 90 which is incorporated in one embodiment of the optical pickup apparatus of the present invention.

Figure 11:
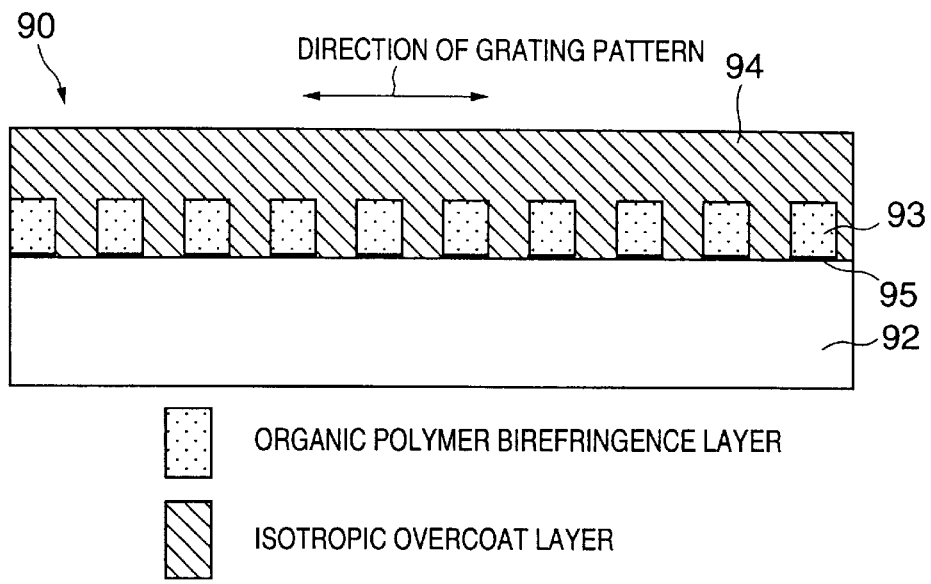
FIG. 11 is a cross-sectional view of a polarization hologram in the optical pickup apparatus of the present invention.

FIG. 11 shows a polarization hologram 90 in one embodiment of the optical pickup apparatus of the present invention.

As shown in FIG. 11, the polarization hologram 90 generally has a transparent substrate 92, a birefringence layer 93, and an isotropic overcoat layer 94. The transparent substrate 92 is made of a glass or resin material. The birefringence layer 93 is made of an organic polymer material (which will be described in detail later), and provided on the transparent substrate 92 in a periodic grating pattern. The birefringence layer 93 is fixed to the transparent substrate 92 by an adhesion layer 95. The birefringence layer 93 of the organic polymer material, provided in the periodic grating pattern, has different refractive indexes for two orthogonal polarizing directions of an incident beam which is the reflection beam from the optical disk in the optical pickup apparatus. The isotropic overcoat layer 94 is provided to enclose the birefringence layer 93 therein. The polarization hologram 90 diffracts the reflection beam in predetermined diffracting directions depending on the wavelength (L1/L2) of the incident reflection beam.

The polarization hologram 90 of FIG. 11 is characterized by the birefringence layer 93 which is formed from a uni-directionally stretched film of an organic polymer material into a periodic grating pattern on the transparent substrate 92. The uni-directional stretching of the organic polymer material creates the difference between the refractive indexes for the two orthogonal polarizing directions of the incident beam. The polarization hologram 90 of FIG. 11 does not require a time-consuming manufacturing process and a high cost, as in the case of the conventional polarization hologram having a birefringence layer of an inorganic crystal material, such as $LiNbO_3$. A large-quantity, low-cost production of the polarization hologram 90 is possible. The polarization hologram 90 of FIG. 11 is inexpensive and can be provided with a small size.

In the polarization hologram 90 of FIG. 11, the birefringence layer 93 is formed from a stretched organic polymer film, and the organic polymer material of the birefringence layer 93 is selected from among polycarbonate (PC), polyvinylalcohol (PVA), polymethylmethacrylate (PMMA), polystyrene, polysulfone (PSF), polyethylsulfone (PES), and polyimide. Obviously, the organic polymer material which is applicable to the polarization hologram 90 is not limited to these examples.

As described above, the birefringence layer 93 in the polarization hologram 90 of FIG. 11 has different refractive indexes for two orthogonal polarizing directions of an incident beam. This operation of the polarization hologram 90 will now be explained with reference to FIG. 12 and FIG. 13.

Figure 12:
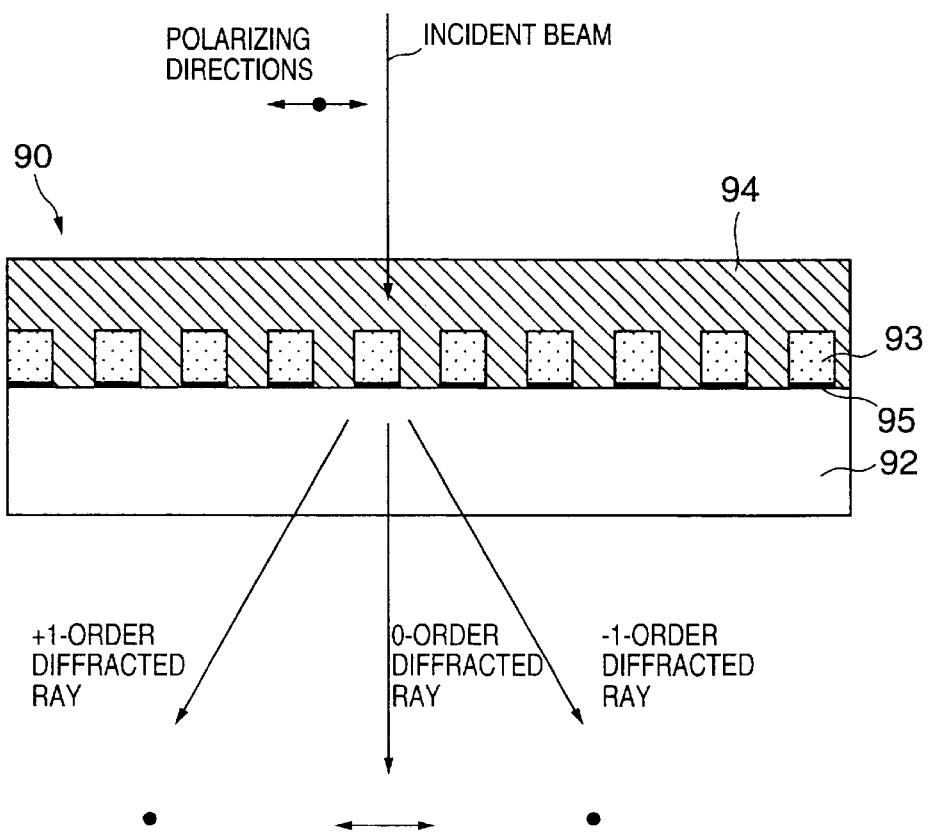
FIG. 12 is a diagram for explaining an operation of the polarization hologram of FIG. 11.

FIG. 12 shows an operation of the polarization hologram 90 of FIG. 11. As shown in FIG. 12, the incident beam (e.g., the reflection beam from the optical disk) to the polarization hologram 90 has two orthogonal polarizing directions: one parallel to the page of the figure (indicated by the lateral arrows in FIG. 12) and the other perpendicular to the page of the figure (indicated by the small dots in FIG. 12) within a normal plane to the incident beam. The incident beam is converted at the polarization hologram 90 into the 0-order diffracted ray (corresponding to the parallel polarizing directions) and the ±1-order diffracted rays (corresponding to the perpendicular polarizing directions). The 0-order diffracted ray travels in a straight line through the polarization hologram 90. The ±1-order diffracted rays are the diffracted reflection beams produced at the polarization hologram 90, which are diffracted in the predetermined diffraction directions to the photodetector 10B as in the optical pickup apparatus of FIG. 10.

Figure 13:
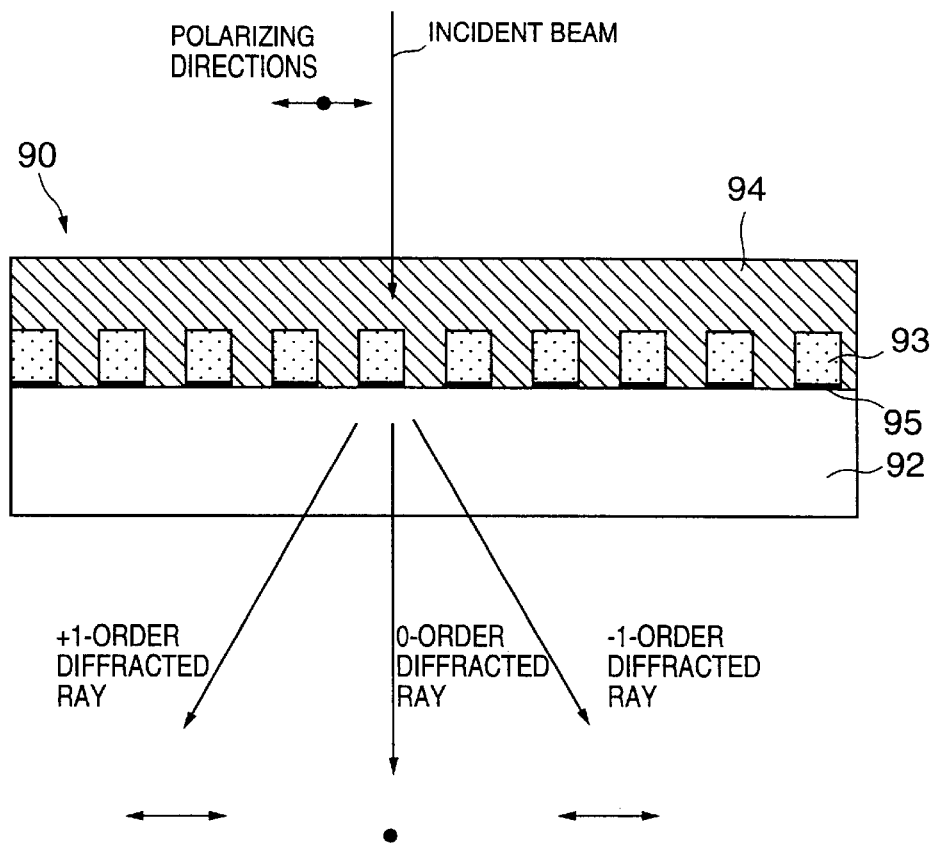
FIG. 13 is a diagram for explaining another operation of the polarization hologram of FIG. 11.

FIG. 13 shows another operation of the polarization hologram 90 of FIG. 11. As shown in FIG. 13, the incident beam to the polarization hologram 90 has two orthogonal polarizing directions: one parallel to the page of the figure (indicated by the lateral arrows in FIG. 13) and the other perpendicular to the page of the figure (indicated by the small dot in FIG. 13) within a normal plane to the incident beam. The incident beam is converted at the polarization hologram 90 into the 0-order diffracted ray (corresponding to the perpendicular polarizing directions) and the ±1-order diffracted rays (corresponding to the parallel polarizing directions). The 0-order diffracted ray travels in a straight line through the polarization hologram 90. The ±1-order diffracted rays are the diffracted reflection beams produced at the polarization hologram 90, which are diffracted in the predetermined diffraction directions to the photodetector 10B as in the optical pickup apparatus of FIG. 10.

Figure 14:
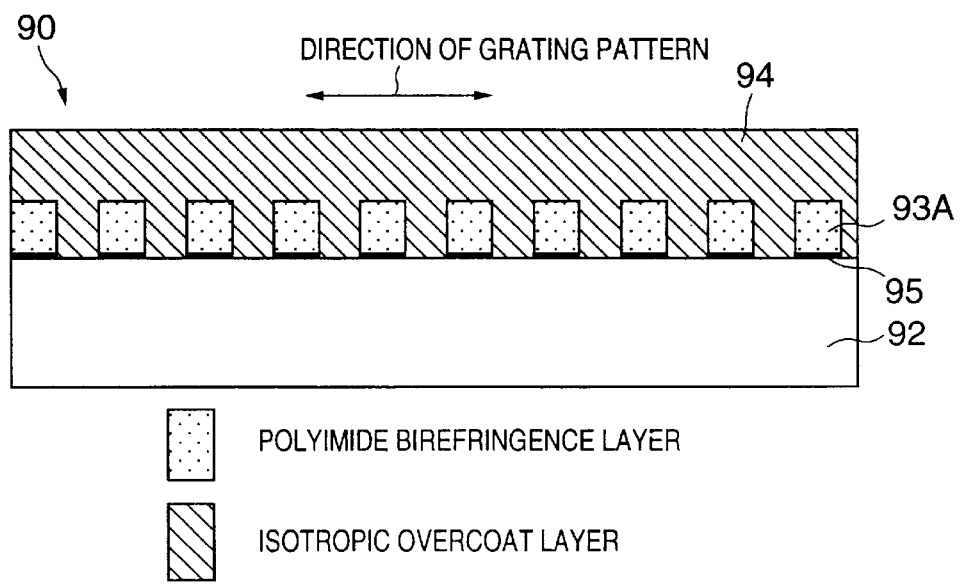
FIG. 14 is a cross-sectional view of another example of the polarization hologram in the optical pickup apparatus of the present invention.

FIG. 14 shows another example of the polarization hologram 90 in one embodiment of the optical pickup apparatus of the present invention.

As shown in FIG. 14, the polarization hologram 90 generally has a transparent substrate 92, a birefringence layer 93A, and an isotropic overcoat layer 94. The transparent substrate 92 is made of a glass or resin material. The birefringence layer 93A is made of an organic polymer material (which will be described in detail later), and provided on the transparent substrate 92 in a periodic grating pattern. The birefringence layer 93 is fixed to the transparent substrate 92 by an adhesion layer 95. The birefringence layer 93 of the organic polymer material, provided in the periodic grating pattern, has different refractive indexes for two orthogonal polarizing directions of an incident beam which is the reflection beam from the optical disk in the optical pickup apparatus. The isotropic overcoat layer 94 is provided to enclose the birefringence layer 93 therein. The polarization hologram 90 diffracts the reflection beam in predetermined diffracting directions depending on the wavelength (L1/L2) of the incident reflection beam.

The polarization hologram 90 of FIG. 14 is characterized by the birefringence layer 93A which is formed by heating and stretching of a polyimide film. The stretching of the organic polymer material creates the difference between the refractive indexes for the two orthogonal polarizing directions of the incident beam. The polyimide birefringence layer 93A provides a relatively large difference (dn=0.13) between the refractive indexes for the two orthogonal polarizing directions of the incident beam. In the case of a LiNbO$_3$ birefringence layer in the conventional polarization hologram, the difference (dn) between the refractive indexes is equal to about 0.08. Hence, the thickness of the periodic grating pattern of the polyimide birefringence layer 93A can be made relatively small. The polarization hologram 90 of FIG. 14 does not require a time-consuming manufacturing process and a high cost, as in the case of the conventional polarization hologram having a LiNbO$_3$ birefringence layer. A large-quantity, low-cost production of the polarization hologram 90 is possible. The polarization hologram 90 of FIG. 14 is inexpensive and can be provided with a small size.

The operation of the polarization hologram 90 of FIG. 14 is essentially the same as the operation of the polarization hologram 90 described above with reference to FIG. 12 and FIG. 13, and a description thereof will be omitted.

Figure 15:
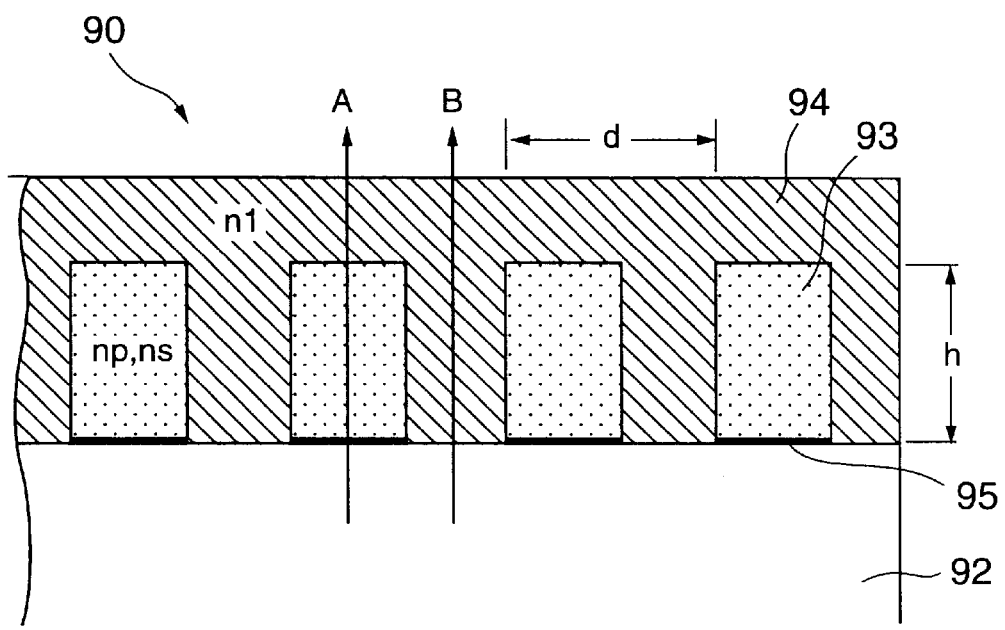
FIG. 15 is a diagram showing essential parts of the polarization hologram of FIG. 11.

FIG. 15 is an enlarged view of essential parts of the polarization hologram of FIG. 11.

As shown in FIG. 15, the polarization hologram 90 is configured with the transparent substrate 92, the birefringence layer 93, and the isotropic overcoat layer 94. The birefringence layer 93 of the organic polymer material is provided on the transparent substrate 92 in the periodic grating pattern. Suppose that a grating pitch of the periodic grating pattern is indicated by "d" in FIG. 15, and a depth of the periodic grating pattern of the birefringence layer 93 is indicated by "h" in FIG. 15. The birefringence layer 93 has different refractive indexes (which are indicated by "np" and "ns" in FIG. 15) for the two orthogonal polarizing directions of the incident beam. The "np" is a refractive index of the layer 93 for a p-polarized-light of the incident beam, and the "ns" is a refractive index of the layer 93 for an s-polarized light of the incident beam. The isotropic overcoat layer 94 has a refractive index which is indicated by "nl" in FIG. 15.

In FIG. 15, an optical path difference Dp between an optical path "A" and an optical path "B" with respect to the parallel polarizing directions is represented by (np−nl)h, while an optical path difference Ds between the optical path A and the optical path B with respect to the perpendicular polarizing directions is represented by (ns−nl)h.

As is apparent from FIG. 15, the configuration requirements of the polarization hologram 90 for achieving the operation of FIG. 12 are that the optical path difference Dp is equal to a multiple of the wavelength of the incident beam and the optical path difference Ds is equal to a multiple of the wavelength of the incident beam plus or minus the half wave length. Therefore, the polarization hologram 90 in this case is configured to substantially satisfy the following requirements $$(np-nl)h=mL \quad (3)$$

$$(ns-nl)h=(m\pm\tfrac{1}{2})L \quad (4)$$

where L is the wavelength of the incident beam, and m is an integer (m=0, ±1, ±2, . . . ). Practically, the above requirements (3) and (4) are not strictly satisfied in determining the configuration of the polarization hologram 90, but the refractive indexes np and ns of the layer 93, the refractive index nl of the layer 94, the depth h of the periodic grating pattern of the layer 93, and the integer m are optimized through experiments so as to substantially satisfy the above requirements (3) and (4).

Similarly, the configuration requirements of the polarization hologram 90 for achieving the operation of FIG. 13 are that the optical path difference Dp is equal to a multiple of the wavelength of the incident beam plus or minus the half wave length, and the optical path difference Ds is equal to a multiple of the wavelength of the incident beam. Therefore, the polarization hologram 90 in this case is configured to substantially satisfy the following requirements $$(np-nl)h=(m+½)L \quad (5)$$

$$(ns-nl)h=mL \quad (6)$$

Practically, the above requirements (5) and (6) are not strictly satisfied in determining the configuration of the polarization hologram 90, but the refractive indexes np and ns of the layer 93, the refractive index nl of the layer 94, the depth h of the periodic grating pattern of the layer 93, and the integer m are optimized through experiments so as to substantially satisfy the above requirements (5) and (6).

FIG. 16A through FIG. 16F show a process of production of the polarization hologram 90 in the optical pickup apparatus of the present invention.

The polarization hologram 90 is produced by preparing a stretched organic polymer film. The birefringence layer 93 is formed from the stretched organic polymer film into a periodic grating pattern on the transparent substrate 92. The stretching of the organic polymer material creates the difference between the refractive indexes of the birefringence layer 93 for the two orthogonal polarizing directions of the incident beam. The organic polymer material of the birefringence layer 93 is selected from among polycarbonate (PC), polyvinylalcohol (PVA), polymethylmethacrylate (PMMA), polystyrene, polysulfone (PSF), polyethylsulfone (PES), and polyimide. Obviously, the organic polymer material which is applicable to the polarization hologram 90 is not limited to these examples.

Figure 16A:
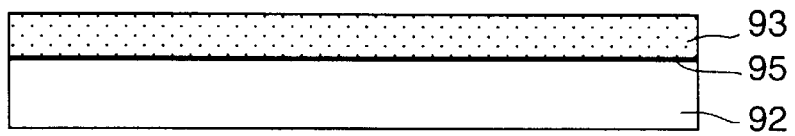
FIG. 16A through FIG. 16F are diagrams for explaining a process of production of the polarization hologram in the optical pickup apparatus of the present invention.
Figure 16B:
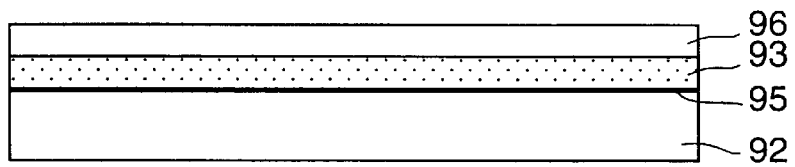
Figure 16C:
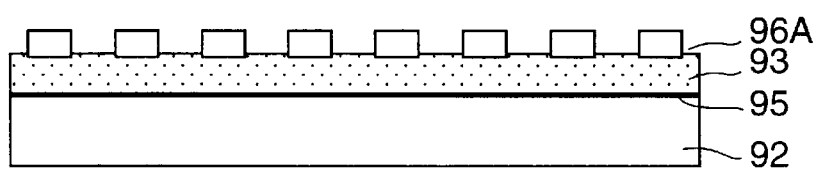

At a start of the production process, the birefringence layer 93 is fixed onto the surface of the transparent substrate 92 by the adhesion layer 95 as shown in FIG. 16A. A photoresist 96 is attached to the birefringence layer 93 through spin coating as shown in FIG. 16B. The photoresist 96 is covered with a photomask having a periodic grating pattern, and it is exposed to UV light. After development, a photoresist mask 96A in the periodic grating pattern is formed on the birefringence layer 93 as shown in FIG. 16C.

Figure 16D:
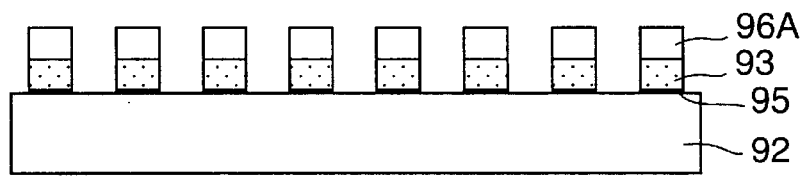
Figure 16E:
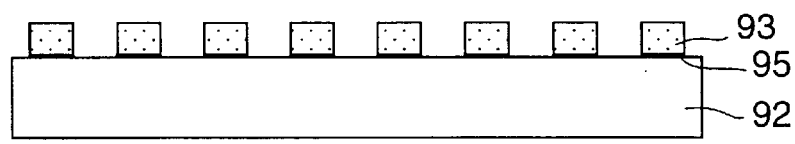
Figure 16F:
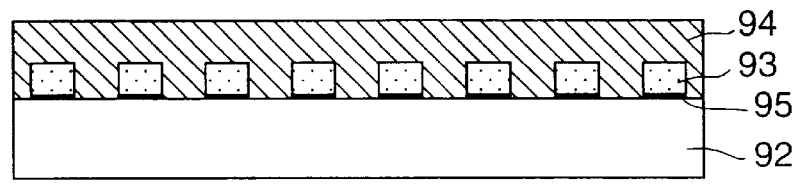

A known dry etching, such as sputter etching, is performed, and unmasked portions of the birefringence layer 93 are removed by etching as shown in FIG. 16D. The photoresist mask 96A is removed by dissolving with a suitable solvent (or gas), and the birefringence layer 93 is provided on the transparent substrate 92 in the periodic grating pattern as shown in FIG. 16E. Finally, as shown in FIG. 16F, an isotropic resin is applied to the birefringence layer 93 through spin coating such that the periodic grating pattern of the birefringence layer 93 is enclosed in the isotropic resin, and the isotropic resin is solidified by UV light or heat so that the isotropic overcoat layer 94 is formed.

In the above-described process of production of the polarization hologram 90, the lithographic method and the spin coating are used to form the birefringence layer 93 and the isotropic overcoat layer 94. The polarization hologram 90 does not require a time-consuming manufacturing process and a high cost, as in the case of the conventional polarization hologram having a LiNbO₃ birefringence layer. A large-quantity, low-cost production of the polarization hologram 90 is possible. The polarization hologram 90 is inexpensive and can be provided with a small size.

FIG. 17 shows a modified polarization hologram 90A in the optical pickup apparatus of the present invention.

In the previous embodiments of FIG. 11 and FIG. 14, the unmasked portions of the birefringence layer 93 are completely removed (up to the substrate 92) by etching as shown in FIG. 16D. This configuration may be modified according to the present invention. In the polarization hologram 90A, the unmasked portions of the birefringence layer 93 are partially removed by etching such that the depth of the removed portions is equal to the depth h of the periodic grating pattern of the layer 93, as shown in FIG. 17.

FIG. 18 shows another modified polarization hologram 90B in the optical pickup apparatus of the present invention.

In the previous embodiments of FIG. 11 and FIG. 14, the periodic grating pattern of the birefringence layer 93 is enclosed in the isotropic overcoat layer 94. This configuration may be modified according to the present invention. In the polarization hologram 90B, the periodic grating pattern of the layer 93 is enclosed in an isotropic resin adhesion layer 97, and a transparent substrate 98, such as of a glass or resin material, is fixed to the birefringence layer 93 by using the isotropic resin adhesion layer 97 as shown in FIG. 18.

The process of production of the polarization hologram 90 according to the present invention is not limited to the embodiment of FIG. 16A through FIG. 16F. In an alternative embodiment, before fixing the birefringence layer 93 to the transparent substrate 92 by the adhesion layer 95, the periodic grating pattern of the birefringence layer 93 may be formed first. After the formation of the birefringence layer 93, it may be fixed to the transparent substrate 92 by the adhesion layer 95.

FIG. 19A through FIG. 19H show another process of production of the polarization hologram in the optical pickup apparatus of the present invention.

Figure 19A:
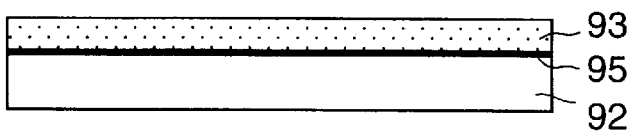
FIG. 19A through FIG. 19H are diagrams for explaining another process of production of the polarization hologram in the optical pickup apparatus of the present invention.
Figure 19B:
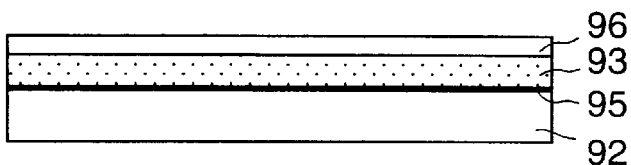
Figure 19C:
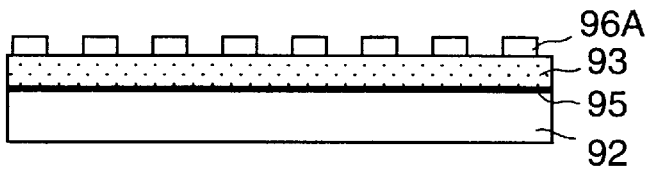

In the present embodiment, the steps of FIG. 19A through FIG. 19C are essentially the same as the steps of FIG. 16A through FIG. 16C, and a description thereof will be omitted.

Figure 19D:
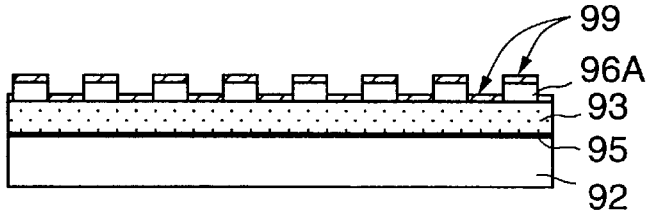
Figure 19E:
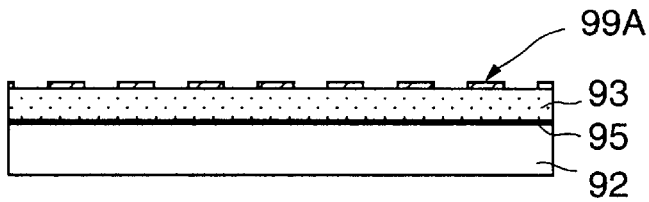

After the photoresist mask 96A in the periodic grating pattern is formed on the birefringence layer 93 as shown in FIG. 19C, a metallic layer 99, such as of aluminum or chromium, is deposited on the photoresist 96A and on the birefringence layer 93 by evaporation or sputtering as shown in FIG. 19D. The photoresist mask 96A is removed by dissolving with a suitable solvent (or gas), and a metallic grating pattern 99A remains on the birefringence layer 93 as shown in FIG. 19E.

Figure 19F:
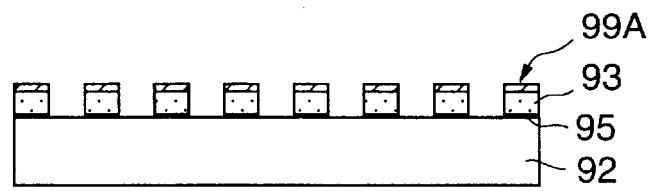
Figure 19G:
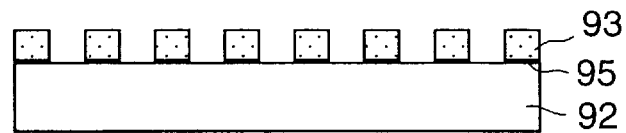
Figure 19H:
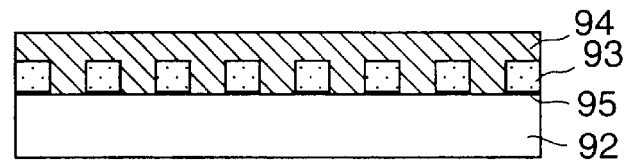

A known dry etching is performed, and unmasked portions of the birefringence layer 93 are removed by etching, and the metallic grating pattern 99A and the birefringence layer 93 remain as shown in FIG. 19F. The metallic grating pattern 99A is removed by dissolving with a suitable solvent (e.g., sulfuric acid), and the birefringence layer 93 is provided on the transparent substrate 92 in the periodic grating pattern as shown in FIG. 19G. Finally, as shown in FIG. 19H, an isotropic resin is applied to the birefringence layer 93 through spin coating such that the periodic grating pattern of the birefringence layer 93 is enclosed in the isotropic resin, and the isotropic resin is solidified by UV light or heat so that the isotropic overcoat layer 94 is formed.

The process of production of the polarization hologram 90 according to the present invention is not limited to the embodiment of FIG. 19A through FIG. 19H. In an alternative embodiment, the metallic layer 99, such as of aluminum or chromium, is first deposited on the birefringence layer 93 shown in FIG. 19A, and the steps of FIG. 19B through FIG. 19F are performed with the metallic layer 99.

In the embodiment of FIG. 19A through FIG. 19H, the unmasked portions of the birefringence layer 93 are completely removed (up to the substrate 92) by etching. This configuration may be modified according to the present invention. In an alternative embodiment, the unmasked portions of the birefringence layer 93 are partially removed by etching such that the depth of the removed portions is equal to the depth h of the periodic grating pattern of the layer 93, as shown in FIG. 17.

In the embodiment of FIG. 19A through FIG. 19H, the periodic-grating pattern of the birefringence layer 93 is enclosed in the isotropic overcoat layer 94. This configuration may be modified according to the present invention. In an alternative embodiment, the periodic grating pattern of the layer 93 is enclosed in the isotropic resin adhesion layer 97, and the transparent substrate 98, such as of a glass or resin material, is fixed to the birefringence layer 93 by using the isotropic resin adhesion layer 97 as shown in FIG. 18.

Figure 20A:
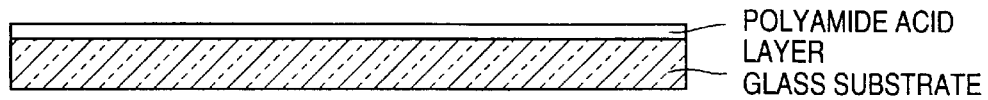
FIG. 20A, FIG. 20B and FIG. 20C are diagrams for explaining a process of preparation of a polyimide film for a birefringence layer of the polarization hologram.
Figure 20B:
Figure 20C:
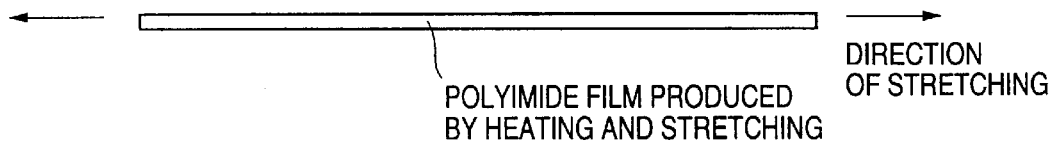

FIG. 20A, FIG. 20B and FIG. 20C show a process of preparation of a polyimide film for the birefringence layer 93 of the polarization hologram 90.

At a start of the process of preparation of the polyimide film, a polyamide acid solution (with a dimethylalcohol solvent) is applied to a flat surface of a glass substrate (or a silicon substrate) through spin coating as shown in FIG. 20A. After drying, the resulting polyamide acid layer has a given thickness. The polyamide acid layer is removed from the glass substrate as shown in FIG. 20B. After removal, the polyamide acid layer is placed in a high-temperature condition (e.g., 350° C.) and the polyamide acid layer is stretched in one direction. The polyimide film is produced from the polyamide acid layer by heating and stretching. The stretching creates the difference between the refractive indexes of the polyimide birefringence layer for the two orthogonal polarizing directions of the incident beam. The difference between the refractive indexes varies depending on the temperature and the stretching force. In a typical polyimide birefringence layer, the refractive index for the direction of stretching is 1.62, the refractive index for the direction perpendicular to the direction of stretching is 1.49, and the refractive index difference dn is about 0.13.

As described above with reference to FIG. 14, the birefringence layer 93A is formed by heating and stretching of the polyimide film as shown in FIG. 20C.

The present invention is not limited to the above-described embodiments, and variations and modifications may be made without departing from the scope of the present invention.

Further, the present invention is based on Japanese priority application No.10-242135, filed on Aug. 27, 1998, and Japanese priority application No.10-255734, filed on Sep. 9, 1999, the entire contents of which are hereby incorporated by reference.

What is claimed is:

1. An optical pickup apparatus comprising:
   a polarization hologram; and
   wherein said polarization hologram of said optical pickup apparatus comprises:
   a transparent substrate;
   a birefringence layer of a stretched organic polymer material provided on the transparent substrate in a periodic grating pattern, the birefringence layer having different refractive indexes for two orthogonal polarizing directions of a reflection beam; and
   an isotropic overcoat layer provided to enclose the birefringence layer therein, the polarization hologram diffracting the reflection beam in predetermined diffracting directions depending on the wavelength of an incident reflection beam.

2. The optical pickup apparatus according to claim 1 wherein the stretching of the organic polymer material creates a difference between the refractive indexes of the birefringence layer for two orthogonal polarizing directions of an incident reflection beam.

3. The optical pickup apparatus according to claim 1, wherein the birefringence layer is configured with a stretched organic polymer film, and the organic polymer material of the birefringence layer being selected from among polycarbonate, polyvinylalcohol, polymethylmethacrylate, polystyrene, polysulfone, polyethylsulfone, and polyimide.

4. The optical pickup apparatus according to claim 1, wherein the birefringence layer is configured with a heated and stretched polyimide film.

5. The optical pickup apparatus according to claim 1, wherein the polarization hologram is configured to substantially satisfy the following requirements $$(np-nl)h=mL$$

$$(ns-nl)h=(m+\tfrac{1}{2})L$$

where np is a refractive index of the birefringence layer for a p-polarized light of the reflection beam, ns is a refractive index of the birefringence layer for an s-polarized light of the reflection beam, nl is a refractive index of the isotropic overcoat layer, h is a depth of the periodic grating pattern, L is a wavelength of the reflection beam, and m is an integer (m=0, +1, +2, ...).

6. The optical pickup apparatus according to claim 1, wherein the polarization hologram is configured to substantially satisfy the following requirements $$(np-nl)h=(m+\tfrac{1}{2})L$$

$$(ns-nl)h=mL$$

where np is a refractive index of the birefringence layer for a p-polarized light of the reflection beam, ns is a refractive index of the birefringence layer for an s-polarized light of the reflection beam, nl is a refractive index of the isotropic overcoat layer, h is a depth of the periodic grating pattern, L is a wavelength of the reflection beam, and m is an integer (m=0, +1, +2, ...).

7. The optical pickup apparatus according to claim 1 wherein the birefringence layer has a thickness larger than a depth of the periodic grating pattern of the birefringence layer, and the isotropic overcoat layer is not in contact with the transparent substrate.

8. The optical pickup apparatus according to claim 1 wherein said polarization hologram comprises a second transparent substrate provided on the isotropic overcoat layer to cover the birefringence layer, and the isotropic overcoat layer being an isotropic resin adhesion layer, and the second transparent substrate being fixed to the birefringence layer by using the isotropic resin adhesion layer.

9. The optical pickup apparatus according to claim 1 wherein the isotropic overcoat layer is provided by applying an isotropic resin to the birefringence layer.

* * * * *